(12) United States Patent
Ishikawa et al.

(10) Patent No.: US 6,203,466 B1
(45) Date of Patent: Mar. 20, 2001

(54) CONTINUOUSLY VARIABLE TRANSMISSION APPARATUS

(75) Inventors: Kouji Ishikawa, Fujisawa; Takashi Imanishi, Yokohama; Hisashi Machida, Fujisawa; Shinji Miyata, Fujisawa; Hiroyuki Itoh, Fujisawa, all of (JP)

(73) Assignee: NSK Ltd., Tokyo (JP)

( * ) Notice: Subject to any disclaimer, the term of this patent is extended or adjusted under 35 U.S.C. 154(b) by 0 days.

(21) Appl. No.: 09/361,306

(22) Filed: Jul. 27, 1999

(51) Int. Cl.[7] .................................................. F16H 37/02
(52) U.S. Cl. .............................................................. 475/216
(58) Field of Search ............................................... 475/216

(56) References Cited

U.S. PATENT DOCUMENTS

| | | | | |
|---|---|---|---|---|
| 4,872,371 | * | 10/1989 | Fellows | 475/216 |
| 5,888,160 | * | 3/1999 | Miyata et al. | 475/216 |

FOREIGN PATENT DOCUMENTS

| | | |
|---|---|---|
| 197 50 166 | 5/1998 | (DE) . |
| 0 899 484 | 3/1999 | (EP) . |
| 0 899 485 | 3/1999 | (EP) . |
| 0 905 413 | 3/1999 | (EP) . |
| 62-71465 | 5/1987 | (JP) . |
| 1-169169 | 7/1989 | (JP) . |
| 1-282266 | 11/1989 | (JP) . |
| 1-173552 | 12/1989 | (JP) . |
| 8-159236 | 6/1996 | (JP) . |
| 11-148546 | 6/1999 | (JP) . |

OTHER PUBLICATIONS

Gackstetter, G.; "Auswahl von Planetengetrieben zur Leistungsverzweigung fur Regelgetriebe", *Konstruktion*, 1965, No. 9.

* cited by examiner

*Primary Examiner*—Dirk Wright
(74) *Attorney, Agent, or Firm*—Vorys, Sater, Seymour and Pease LLP

(57) ABSTRACT

This invention realizes a compact and light-weight structure having excellent durability and transmission efficiency. A toroidal type continuously variable transmission is provided around an input shaft concentric with a driving shaft, and a planetary gear mechanism is provided around an output shaft. This output shaft is disposed obliquely above the input shaft. By such disposition, the effective utilization of space is achieved, and compactness and lighter weight are realized.

14 Claims, 9 Drawing Sheets

CONTINUOUSLY VARIABLE TRANSMISSION APPARATUS

BACKGROUND OF THE INVENTION

1. Field of the Invention

This invention relates to improvements in a continuously variable transmission apparatus incorporating therein, for example, a toroidal type continuously variable transmission utilized as a transmission for an automobile, and realizes compact structure capable of securing the durability of the constituent members of the toroidal type continuously variable transmission.

2. Related Background Art

For example, it has been studied to use a toroidal type continuously variable transmission as schematically shown in FIGS. 6 and 7 of the accompanying drawings as a transmission for an automobile. This toroidal type continuously variable transmission, as disclosed, for example, in Japanese Laid-Open Utility Model Application No. 62-71465, has an input disc 2 supported concentrically with an input shaft 1, and has an output disc 4 fixed to the end portion of an output shaft 3 disposed concentrically with the input shaft 1. Inside a casing containing the toroidal type continuously variable transmission, there are provided trunnions 6, 6 pivotatally moved about pivots 5, 5 on axes transverse to the input shaft 1 and the output shaft 3.

That is, the pivots 5, 5 of each trunnion are provided coaxially with each other on the outer sides of the opposite end portions of the trunnion. Also, the base end portions of displaceable shafts 7, 7 are supported on the central portions of the trunnions 6, 6, and the trunnions 6, 6 are pivotally moved about the pivots 5, 5, whereby the angles of inclination of the displaceable shafts 7, 7 are made adjustable. Power rollers 8, 8 are rotatably supported around the displaceable shafts 7, 7 supported on the trunnions 6, 6. These power rollers 8, 8 are sandwiched between the input and, output discs 2 and 4. The inner sides 2a and 4a of these input and output discs 2 and 4 which are opposed to each other have their cross-sections forming concave surfaces obtained with arcs centering about the pivots 5 rotated about the center axes of the discs. The peripheral surfaces 8a, 8a of the power rollers 8, 8 which are formed into spherical convex surfaces, are made to bear against the above-mentioned inner sides 2a and 4a, respectively.

A loading cam type pressing device 9 is provided between the input shaft 1 and the input disc 2, and by this pressing device 9, the input disc 2 can be resiliently pressed toward the output disc 4. This pressing device 9 is comprised of a cam plate 10 rotated with the input shaft 1, and a plurality of (e.g. four) rollers 12 held by a holder 11. A cam surface 13 which is an uneven surface extending in the circumferential direction is formed on one side (the left side as viewed in FIGS. 6 and 7) of the cam plate 10, and a similar cam surface 14 is also formed on the outer side (the right side as viewed in FIGS. 6 and 7) of the input disc 2. The plurality of rollers 12, 12 are supported for rotation about radial shafts relative to the center of the input shaft 1.

When during the use of the toroidal type continuously variable transmission constructed as described above, the cam plate 10 rotates with the rotation of the input shaft 1, the plurality of rollers 12 are pressed against the cam surface 14 formed on the outer side of the input disc 2 by the cam surface 13. As a result, the input disc 2 is pressed against the plurality of power rollers 8, 8 and at the same time, on the basis of the pair of cam surfaces 13, 14 and the plurality of rollers 12, 12 being urged against each other, the input disc 2 is rotated. The rotation of this input disc 2 is transmitted to the output disc 4 through the plurality of power rollers 8, 8, whereby the output shaft 3 fixed to this output disc 4 is rotated.

When the rotational speed ratio (transmission gear ratio) between the input gear 1 and the output gear 3 is to be changed and deceleration is to be effected between the input shaft 1 and the output shaft 3, the trunnions 6, 6 are pivotally moved about the pivots 5, 5 and the displaceable shafts 7, 7 are inclined so that the peripheral surfaces 8a, 8a of the power rollers 8, 8 may bear against that portion of the inner side 2a of the input disc 2 which is toward the center thereof and that portion of the inner side 4a of the output disc 4 which is toward the outer periphery thereof, as shown in FIG. 6. When conversely, acceleration is to be effected, the trunnions 6, 6 are pivotally moved and the displaceable shafts 7, 7 are inclined so that the peripheral surfaces 8a, 8a of the power rollers 8, 8 may bear against that portion of the inner side 2a of the input disc 2 which is toward the outer periphery thereof and that portion of the inner side 4a of the output disc 4 which is toward the center thereof, as shown in FIG. 7. Also, if the angle of inclination of the displaceable shafts 7, 7 is made medium between FIGS. 6 and 7, a medium transmission gear ratio will be obtained between the input shaft 1 and the output shaft 3.

FIGS. 8 and 9 of the accompanying drawings show a more specific example of the toroidal type continuously variable transmission described in the microfilm of Japanese Utility Model Application No. 63-69293 (Japanese Laid-Open Utility Model Application No. 1-173552). An input disc 2 and an output disc 4 are rotatably supported around a tubular input shaft 15 through needle bearings 16 and 16, respectively. Also, a cam plate 10 is spline-engaged with the outer peripheral surface of an end portion (the left end portion as viewed in FIG. 8) of the input shaft 15 and blocks the movement away from the input disc 2 by a flange portion 17. This cam plate 10 and rollers 12, 12 together constitute a pressing device 9 for rotating the input disc 2 on the basis of the rotation of the input shaft 15 while pressing it toward the output disc 4. An output gear 18 is coupled to the output disc 4 by keys 19, 19 so that the output disc 4 and the output gear 18 may be rotated in synchronism with each other.

The opposite end portions of a pair of trunnions 6, 6 are supported on a pair of support plates 20, 20 for pivotal movement and displacement in the axial direction thereof (the front to back direction as viewed in FIG. 8, and the left to right direction as viewed in FIG. 9). Displaceable shafts 7, 7 are supported in circular holes 21, 21 formed in the intermediate portions of the trunnions 6, 6. These displaceable shafts 7, 7 have support shaft portions 22, 22 and pivotal support shaft portions 23, 23 parallel to each other and eccentric with respect to each other. The support shaft portions 22, 22 are rotatably supported inside the circular holes 21, 21 through radial needle bearings 24, 24. Also, power rollers 8, 8 are rotatably supported around the pivotal support shaft portions 23, 23 through discrete radial needle bearings 25, 25.

The pair of displaceable shafts 7, 7 are provided at positions opposite by 180° with respect to the input shaft 15. Also, the directions in which the pivotal support shaft portions 23, 23 of these displaceable shafts 7, 7 are eccentric with respect to the support shaft portions 22, 22 are the same direction (left and right converse directions as viewed in FIG. 9) with respect to the direction of rotation of the input and output discs 2 and 4. Also, the direction of eccentricity is a direction substantially orthogonal to the direction of disposition of the input shaft 15. Accordingly, the power rollers 8, 8 are supported for some displacement in the direction of disposition of the input shaft 15. As the result, even when the power rollers 8, 8 tend to be displaced in the axial direction of the input shaft 15 (the left to right direction as viewed in FIG. 8, and the front to back direction as viewed in FIG. 9) due to the resilient deformation of each constituent member based on a great load applied to each constituent member in a state in which the rotational force is being transmitted, this displacement can be absorbed without any unreasonable force being applied to each constituent member.

Also, between the outer sides of the power rollers 8, 8 and the inner sides of the intermediate portions of the trunnions 6, 6, thrust ball bearings 26, 26 and thrust needle bearings 27, 27 are provided in succession from the outer sides of the power rollers 8, 8. The thrust ball bearings 26, 26 permit the rotation of the power rollers 8, 8 while supporting the load in the thrust direction applied to the power rollers 8, 8. The thrust needle bearings 27, 27 permit the pivotal support shaft portions 23, 23 and outer races 28, 28 constituting the thrust ball bearings 26, 26 to be pivotally moved about the support shaft portions 22, 22 while supporting thrust loads applied from the power roller 8, 8 to the outer races 28, 28.

Further, driving rods 29, 29 are coupled to one end portion (the left end portion as viewed in FIG. 9) of the trunnions 6, 6, and driving pistons 30, 30 are secured to the outer peripheral surfaces of the intermediate portions of these driving rods 29, 29. These driving pistons 30, 30 are oil-tightly fitted in driving cylinders 31, 31.

During the operation of the toroidal type continuously variable transmission constructed as described above, the rotation of the input shaft 15 is transmitted to the input disc 2 through the pressing device 9. The rotation of this input disc 2 is transmitted to the output disc 4 through the pair of power rollers 8, 8 and further, the rotation of this output disc 4 is taken out from the output gear 18. When the rotational speed ratio between the input shaft 15 and the output gear 18 is to be changed, the pair of driving pistons 30, 30 are displaced in opposite directions. With the displacement of these driving pistons 30, 30, the pair of trunnions 6, 6 are displaced in opposite directions, and for example, the lower power roller 8 as viewed in FIG. 9 is displaced to the right side as viewed in FIG. 9 and the upper power roller 8 as viewed in FIG. 9 is displaced to the left side as viewed in FIG. 9. As the result, the direction of the force in the tangential direction acting on the portions of contact between the peripheral surfaces 8a, 8a of the power rollers 8, 8 and the inner sides 2a and 4a of the input disc 2 and the output disc 4 changes. With this change in the direction of this force, the trunnions 6, 6 are pivotally moved in opposite directions about the pivots 5, 5 pivotally supported by the support plates 20, 20. As the result, as shown in FIGS. 6 and 7, the position of contact between the peripheral surfaces 8a, 8a of the power rollers 8, 8 and the inner sides 2a and 4a changes and the rotational speed ratio between the input shaft 15 and the output gear 18 changes.

When the transmission of the rotational force is effected between the input shaft 15 and the output gear 18 as described above, the power rollers 8, 8 are displaced axially of the input shaft 15 on the basis of the resilient deformation of each constituent member, and the displaceable shafts 7, 7 pivotally supporting these power rollers 8, 8 slightly rotated about the support shaft portions 22, 22. As a result of this rotation, the outer sides of the outer races 28, 28 of the thrust ball bearings 26, 26 and the inner sides of the trunnions 6, 6 are displaced relative to each other. The force required for this relative displacement is small because the thrust needle bearings 27, 27 are present between these outer and inner sides. Accordingly, the force for changing the angle of inclination of the displaceable shafts 7, 7 as described above may be small.

When the toroidal type continuously variable transmission constructed and acting as described above is to be incorporated into for an automobile, it has heretofore been proposed as described in Japanese Laid-Open Patent Application No. 1-169169 and Japanese Laid-Open Patent Application No. 1-282266 to construct the continuously variable transmission apparatus in combination with a planetary gear mechanism. FIG. 10 of the accompanying drawings schematically shows the basic construction of such a heretofore proposed continuously variable transmission apparatus. The driving shaft 33 (crank shaft) of an engine 32 which is a drive source is coupled to the input shaft 15 (see FIGS. 8 and 9) of a toroidal type continuously variable transmission 34 having the construction as shown in FIGS. 8 and 9. Also, an output shaft 36 for driving the driving wheels through a differential gear 35 (see FIG. 1 of the accompanying drawings which shows an embodiment of the present invention) is coupled and fixed to a sun gear 38 (see FIG. 1) of a planetary gear mechanism 37 and is rotated with this sun gear 38.

Also, the output disc 4 (see FIGS. 1, 6, 7 and 8) of the toroidal type continuously variable transmission 34 and a carrier 39 (see FIGS. 1 and 2) of the planetary gear mechanism 37 are connected together so as to be capable of transmitting the rotational force by a first power transmitting mechanism 41. Also, the driving shaft 33 and the input shaft 15 and a ring gear 42 (see FIGS. 1 and 2) of the planetary gear mechanism 37 can be connected together so as to be capable of transmitting the rotational force by a second power transmitting mechanism 43. Provision is further made of changeover means capable of changing over the speed change state of the driving shaft 33 and the input shaft 15 and the output shaft 36 among three modes, i.e., the high-speed running mode, the low-speed running mode and the receding mode. The ratio β/α between the reduction ratio α of the first power transmitting mechanism 41 and the reduction ratio β of the second power transmitting mechanism 43 is made substantially equal to the reduction ratio during the maximum acceleration of the toroidal type continuously variable transmission 34 (the reduction ratio between the input shaft 1 and the output shaft 3 in the state shown in FIG. 6) $i_H$.

The continuously variable transmission apparatus as shown in FIG. 10 is called the power split type and in the low-speed running mode, it transmits all the power among the driving shaft 33 and the input shaft 15 and the output shaft 36 through the toroidal type continuously variable transmission 34. In contrast, in the high-speed running mode, it transmits the power through the planetary gear mechanism 37, and circulates part of this power from the planetary gear mechanism 37 to the toroidal type continuously variable transmission 34. That is, during the low-speed running, the driving force of the engine 32 is transmitted by only the toroidal type continuously variable transmission 34, and during the high-speed running, the driving force is transmitted by the planetary gear mechanism 37 to thereby reduce the torque applied to the toroidal type continuously variable transmission 34 during the high-speed running. By such construction, the durability of each constituent member of the toroidal type continuously variable transmission 34 can be improved and at the same time, the transmission efficiency of the entire continuously variable transmission apparatus can be achieved.

The continuously variable transmission apparatus of the power split type as described above can achieve the mitigation of the torque transmitted through the toroidal type continuously variable transmission during the high-speed running and can achieve an improvement in durability and an improvement in transmission efficiency. However, it is complicated in structure due to the provision of the first and second power transmitting mechanisms, and it is difficult to make it compact and lightweight.

For example, to make the axial dimensions of the first and second power transmitting mechanisms small to shorten the axial dimension of the continuously variable transmission apparatus, it is preferable that these power transmitting mechanisms not be transmitting mechanisms using a belt or a chain, but gear transmitting mechanisms. On the other hand, when the gear transmitting mechanisms are adopted, it is necessary to effect the transmission of a rotational force between a driving side rotational shaft and a driven side rotational shaft spaced apart from each other without making the gear large in diameter, and to install an idle gear between a driving side gear and a driven side gear to regulate the direction of rotation to a desired direction. With the installation of such an idle gear, an idle shaft for supporting this idle gear becomes necessary, and it becomes difficult to dispose this idle shaft.

SUMMARY OF THE INVENTION

This invention has been made, in view of the above-noted circumstances, to realize a practical structure which can achieve the mitigation of torque transmitted through a toroidal type continuously variable transmission during high-speed running and which can be made compact and light in weight.

The continuously variable transmission apparatus of the present invention is provided with an input shaft connected to a drive source, an output shaft connected to a portion to be driven, a toroidal type continuously variable transmission for changing the angles of inclination of a plurality of power rollers held between an input disc and an output disc to thereby change the transmission gear ratio between the input disc and the output disc, a planetary gear mechanism, a pair of power transmitting mechanisms connecting the toroidal type continuously variable transmission and the planetary gear mechanism together, and changeover means capable of changing over the speed changing state between the input shaft and the output shaft among three modes, i.e., the high-speed running mode, the low-speed running mode and the receding mode. In the low-speed running mode, the power between the input shaft and the output shaft is all transmitted through the toroidal type continuously variable transmission and in the high-speed running mode, the power is transmitted by the planetary gear mechanism and some of the power is circulated to the toroidal type continuously variable transmission through the planetary gear mechanism.

Particularly, in the continuously variable transmission apparatus of the present invention, the toroidal type continuously variable transmission is disposed coaxially with the input shaft and the center axis of the planetary gear mechanism is disposed obliquely upwardly of the input shaft.

The action of the continuously variable transmission apparatus of the present invention constructed as described above is as follows. First, during the low-speed running, the power between the input shaft and the output shaft is all transmitted through the toroidal type continuously variable transmission. For this purpose, for example two of a sun gear, a ring gear and a carrier of the planetary gear mechanism are coupled together, and the sun gear, the ring gear and the carrier are rotated as a unit about the sun gear axis. In this state, only the toroidal type continuously variable transmission transmits the power from the input shaft to the output shaft. The action when the transmission gear ratio between the input and output discs is changed during the low-speed running is similar to that in the case of the prior-art toroidal type continuously variable transmission shown in FIGS. 6 to 9. Of course, in this state, the transmission gear ratio between the input shaft and the output shaft, i.e., the transmission gear ratio of the entire continuously variable transmission apparatus, is proportional to the transmission gear ratio of the toroidal type continuously variable transmission. Also, in this state, the torque inputted to the toroidal type continuously variable transmission becomes equal to the torque applied to the input shaft.

In contrast, during the high-speed running, the power is transmitted by the planetary gear mechanism and some of the power is circulated to the toroidal type continuously variable transmission through this planetary gear mechanism. In this state, torque is transmitted from the carrier of the planetary gear mechanism to the output disc of the toroidal type continuously variable transmission. Also, in this state, the transmission gear ratio of the entire continuously variable transmission apparatus changes in conformity with the speed of revolution of a planetary gear. So, if the transmission gear ratio of the toroidal type continuously variable transmission is changed to thereby change the speed of revolution of the planetary gear, the transmission gear ratio of the entire continuously variable transmission apparatus can be adjusted. That is, in this state, as the transmission gear ratio of the toroidal type continuously variable transmission is changed toward the deceleration side, the transmission gear ratio of the entire continuously variable transmission apparatus changes toward the acceleration side. In the state during such high-speed running, as the transmission gear ratio of the toroidal type continuously variable transmission is changed toward the deceleration side to change the transmission gear ratio of the entire continuously variable transmission apparatus toward the acceleration side, the torque inputted to this toroidal type continuously variable transmission becomes smaller. As a result, the torque inputted to the toroidal type continuously variable transmission during the high-speed running can be made small to thereby improve the durability of the constituent parts of the toroidal type continuously variable transmission.

Particularly, in the case of the present invention, the toroidal type continuously variable transmission is disposed coaxially with the input shaft and the center axis of the planetary gear mechanism is disposed obliquely upwardly of this input shaft and therefore, the constituent members can be efficiently disposed to thereby achieve the compactness and lighter weight of the continuously variable transmission apparatus. That is, the center axis of the toroidal type continuously variable transmission in which the cross-sectional area with respect to a vertical surface present in a direction perpendicular to the center axis becomes large and the center axis of the planetary gear mechanism are disposed in directions deviating from each other with respect to a horizontal direction and a vertical direction and therefore, the width and height of the continuously variable transmission apparatus including the toroidal type continuously variable transmission and the planetary gear mechanism can be made small. An idle gear and an idle shaft can be disposed above the toroidal type continuously variable transmission and sideways of the planetary gear mechanism, and an output portion connected to a differential gear or the like can be disposed below the end portion of the planetary gear mechanism and thus, the effective utilization of space can be achieved.

DESCRIPTION OF THE PREFERRED EMBODIMENTS

First Embodiment

Figure 1:
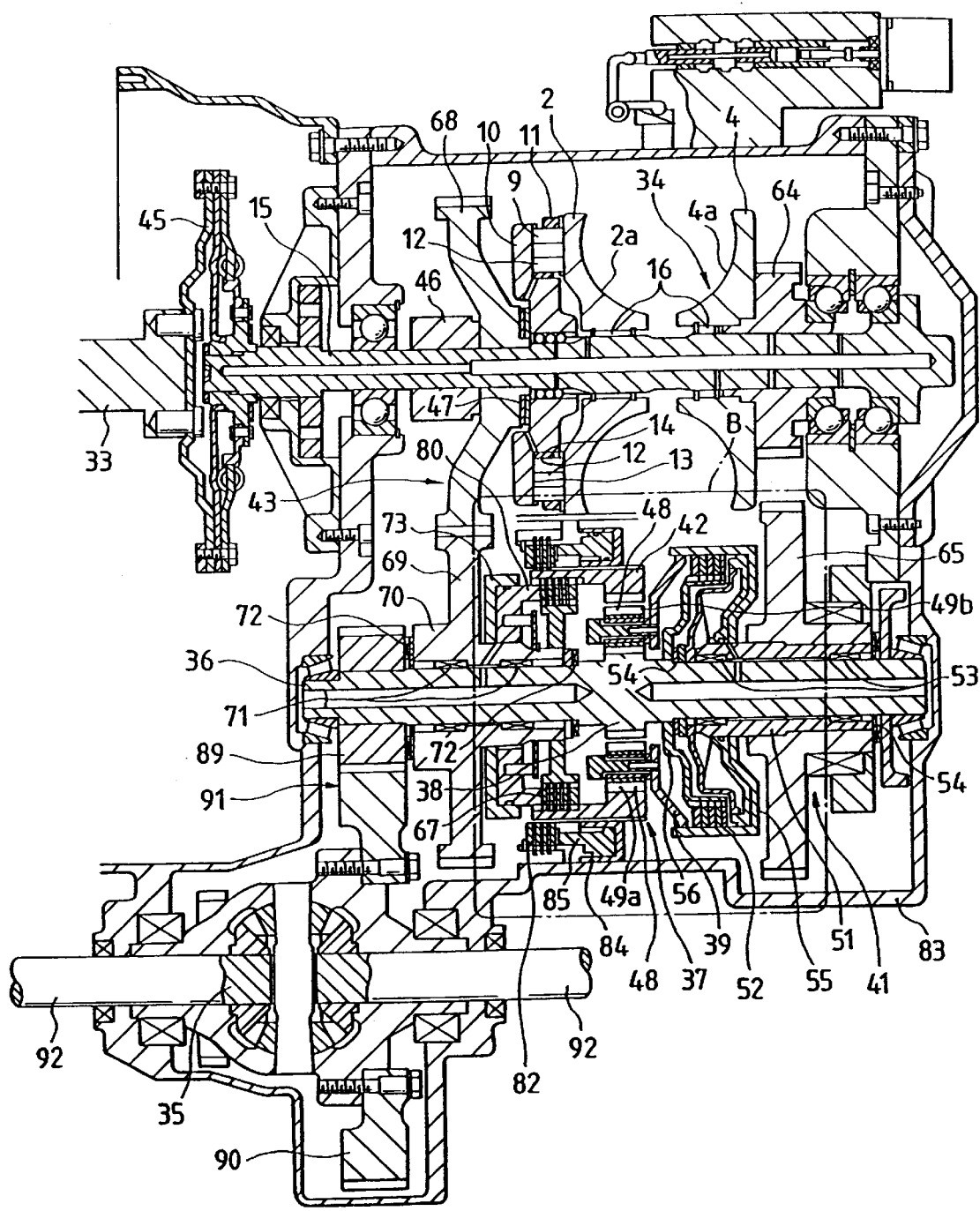
FIG. 1 is a cross-sectional view taken along the line 1—1 of FIG. 3 and showing a first embodiment of the present invention.
Figure 2:
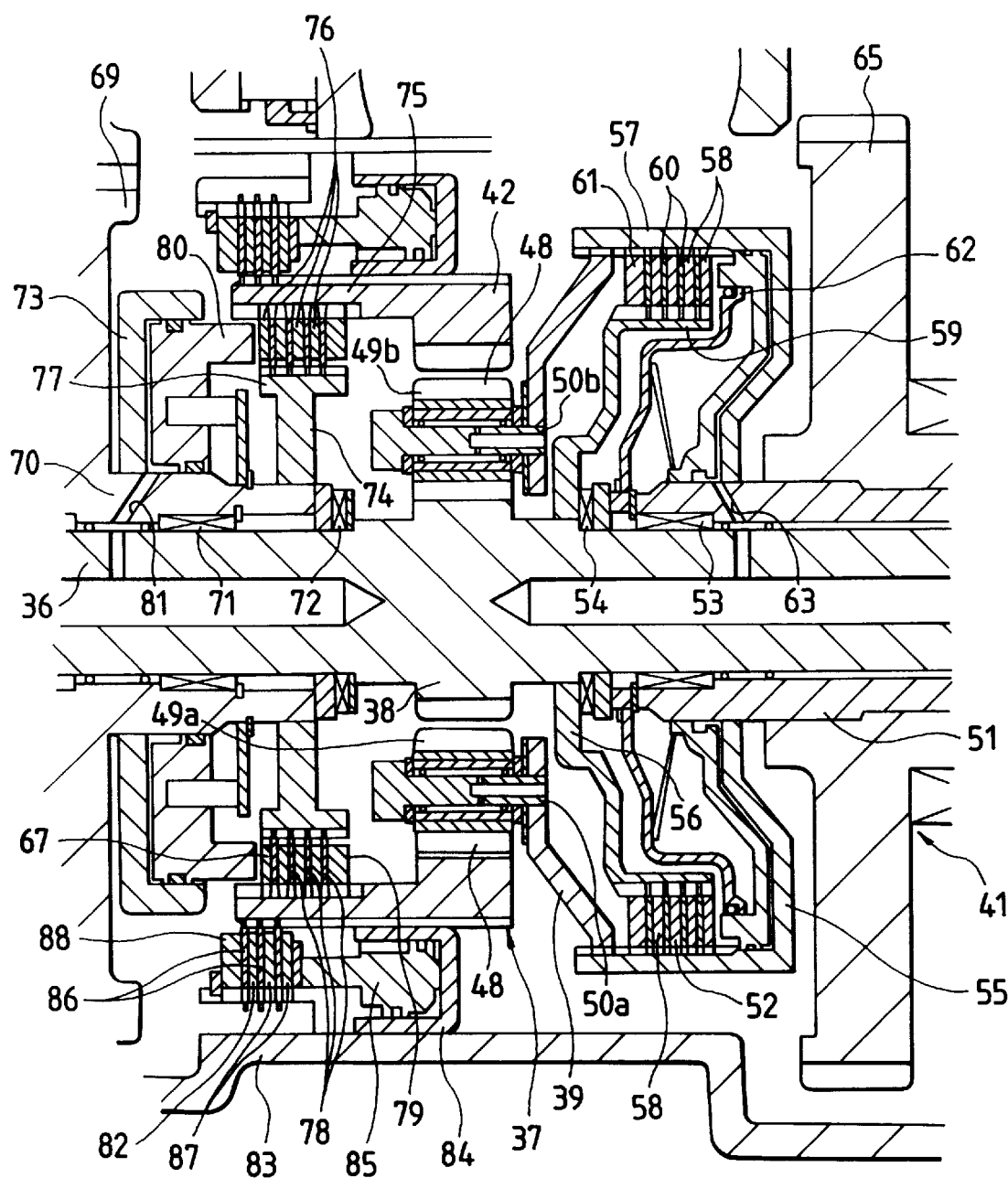
FIG. 2 is an enlarged view of the portion B of FIG. 1.
Figure 3:
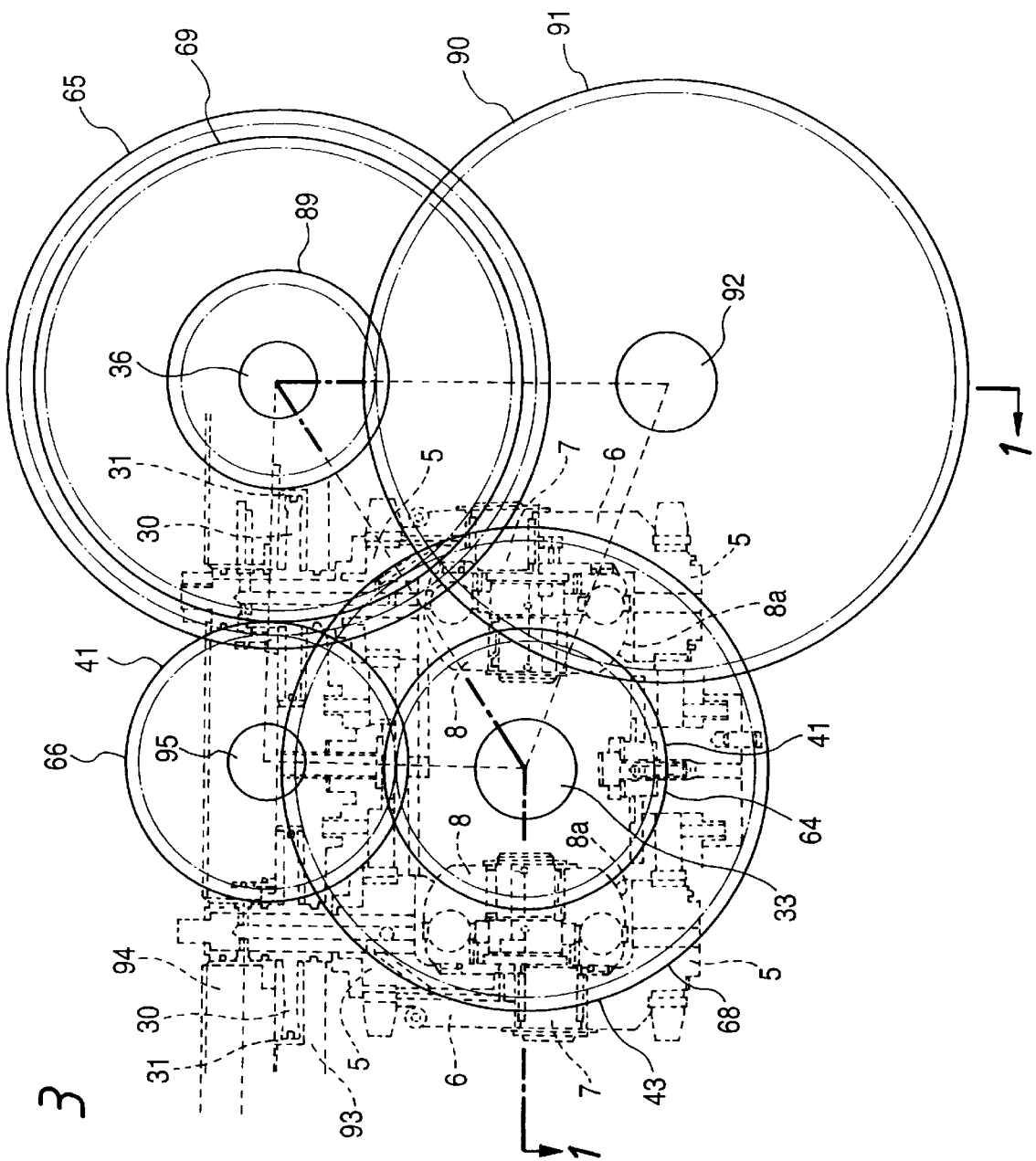
FIG. 3 is a partly seen-through view in which a portion is omitted to show the disposed state of each constituent member and which is seen from the right of FIG. 1.
Figure 10:
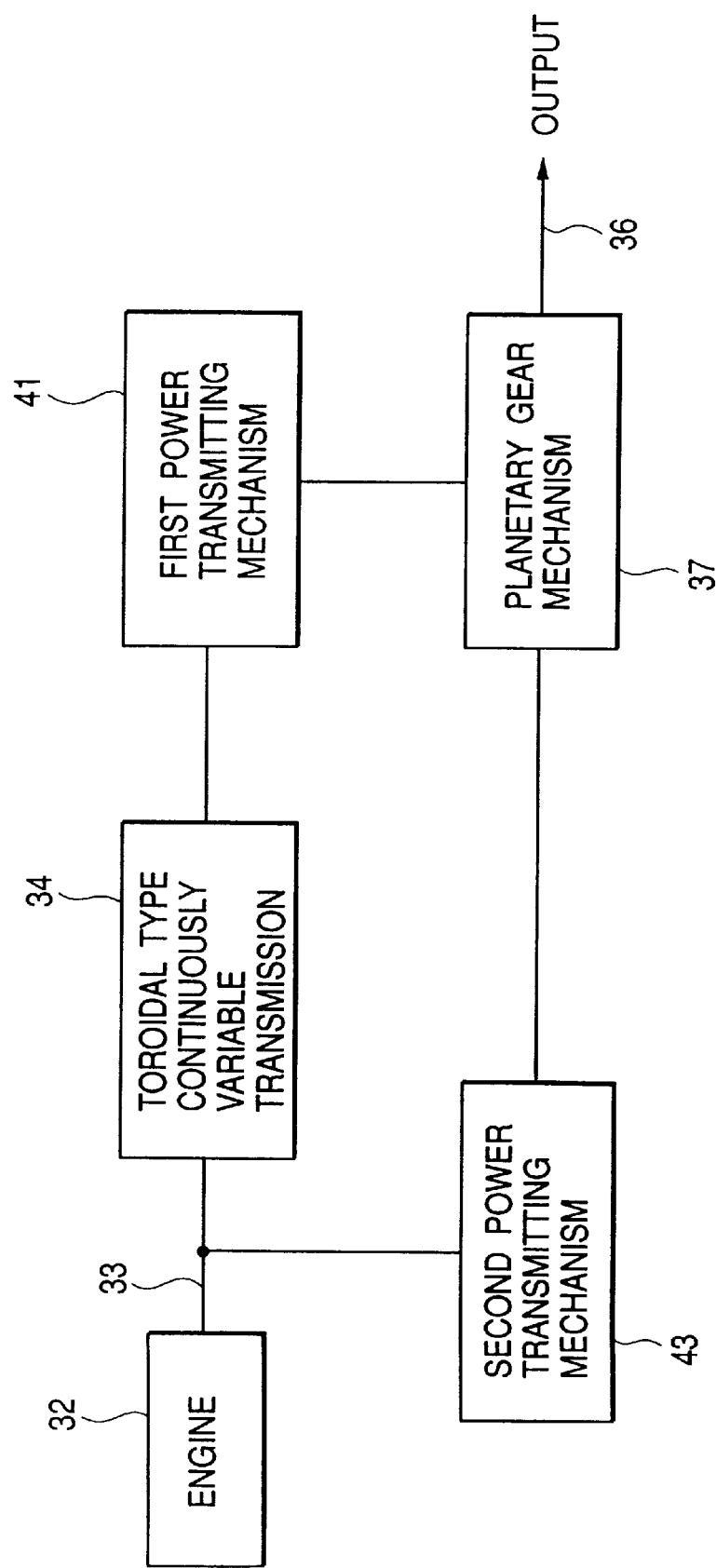
FIG. 10 is a block diagram showing the basic construction of a continuously variable transmission apparatus which is the subject of the present invention.

FIGS. 1 to 3 show a first embodiment of the present invention. In a state in which it is installed in a vehicle, the up and down direction and vertical direction of FIG. 3 substantially coincide with each other. The continuously variable transmission apparatus of the present invention is provided with an input shaft 15 connected to the driving shaft 33 (crank shaft) of an engine 32 (see FIG. 10) which is a drive source and rotatively driven by this engine 32. A starting clutch (not shown) such as a torque converter and a shock absorbing coupling 45 are provided between the input side end portion (the left end portion as viewed in FIG. 1) of the input shaft 15 and the output side end portion (the right end portion as viewed in FIG. 1) of the driving shaft 33 in series with the driving shaft 33 and the input shaft 15. Accordingly, the driving shaft 33 and the input shaft 15 are disposed coaxially with each other. In contrast, an output shaft 36 for taking out motive power based on the rotation of the input shaft 15 is disposed parallel to this input shaft 15. A toroidal type continuously variable transmission 34 and a planetary gear mechanism 37 are provided around the input shaft 15 and the output shaft 36, respectively.

A cam plate 10 of a pressing device 9 of a loading cam type belonging to the toroidal type continuously variable transmission 34 is spline-engaged (ball spline in the illustrated embodiment) with that portion of the intermediate portion of the input shaft 15 which protrudes from the outer side (the left side as viewed in FIG. 1) of an input disc 2 and is supported on the input shaft 15 in a state in which the axial movement away from the input disc 2 is blocked by a loading nut 46 threadably engaged with the intermediate portion of the input shaft 15 and a second driving gear 68 which will be described later. Also, the input disc 2 and an output disc 4 of the toroidal type continuously variable transmission 34 are supported around the input shaft 15 by needle bearings 16, 16 for independent rotation and some axial displacement relative to this input shaft 15. Rollers 12, 12 are sandwiched between a cam surface 13 formed on one surface (the right surface as viewed in FIG. 1) of the cam plate 10 and a cam surface 14 formed on the outer side of the input disc 2 to thereby constitute the pressing device 9. Accordingly, the input disc 2 is rotated while being urged toward the output disc 4 with the rotation of the input shaft 15. The loading nut 46 supports a great thrust load applied to the cam plate 10 during the operation of the pressing device 9. Also, a preload spring 47 such as a belleville spring is provided between the cam plate 10 and the second driving gear 68 to impart a preload to the pressing device 9 and power rollers 8, 8 (to be described) which are sandwiched between the input disc 2 and the output disc 4.

A plurality of (usually two to three) power rollers 8, 8 are sandwiched between the inner side 2a of the input disc 2 and the inner side 4a of the output disc 4, and the peripheral surfaces 8a, 8a of these power rollers 8, 8 and the aforementioned inner sides 2a, 4a are brought into contact with each other. These power rollers 8, 8 are rotatably and pivotally supported by trunnions 6, 6 and displaceable shafts 7, 7. The toroidal type continuously variable transmission 34, like the heretofore widely known toroidal type continuously variable transmission, pivotally moves the trunnions 6, 6 and changes the angles of inclination of the displaceable shafts 7, 7 supporting the power rollers 8, 8 to thereby change the transmission gear ratio between the input disc 2 and the output disc 4.

Also, a sun gear 38 of the planetary gear mechanism 37 is secured to the intermediate portion of the output shaft 36. Accordingly, this output shaft 36 is rotated with the rotation of the sun gear 38. A ring gear 42 is rotatably supported around this sun gear 38 concentrically with the sun gear 38. A plurality of (usually three to four) sets of planetary gears 48, 48 are provided between the inner peripheral surface of the ring gear 42 and the outer peripheral surface of the sun gear 38. In the illustrated example, each of these sets of planetary gears 48, 48 comprises a combination of a pair of planetary gears 49a, 49b. Each pair of planetary gears 49a, 49b are in meshing engagement with each other, and the planetary gear 49a disposed on the outer diameter side is brought into meshing engagement with the ring gear 42 and the planetary gear 49b disposed on the inner diameter side is brought into meshing engagement with the sun gear 38. It is for making the directions of rotation of the ring gear 42 and the sun gear 38 coincident with each other that, as described above, each set of planetary gears 48, 48 are constituted by each pair of planetary gears 49a, 49b. Accordingly, if from the relation with the other constituent portions, it is not necessary to make the directions of rotation of the ring gear 42 and the sun gear 38 coincident with each other, a single planetary gear may be brought into meshing engagement with both of the ring gear 42 and the sun gear 38.

The sets of planetary gears 48, 48 as described above are rotatably supported on one side (the left side as viewed in FIG. 1) of a carrier 39 by pivots 50a, 50b parallel to the output shaft 36. Also, the carrier 39 is rotatably supported on the intermediate portion of the output shaft 36 through a first sleeve 51 and a clutch 52 for low speed. The first sleeve 51 is rotatably supported around the intermediate portion of the output shaft 36 by each pair of radial bearings 53, 53 and each pair of thrust bearings 54, 54 which are rolling bearings such as needle bearings. Also, the clutch 52 for low speed which is a wet type multiplate clutch is provided with a clutch case 55 fixed to the outer peripheral surface of the first sleeve 51, and a rotatable plate 56 fixed to the outer peripheral surface of the intermediate portion of the output shaft 36. Outer frictional plates 58, 58 spline-engaged with the inner peripheral surface of an outer cylindrical portion 57 formed on the outer peripheral edge portion of the clutch case 55 and inner frictional plates 60, 60 spline-engaged with the outer peripheral surface of an inner cylindrical portion 59 formed on the outer peripheral edge portion of the rotatable plate 56 are alternately disposed in the axial direction. Further, a fixed plate 61 is fixed to an axial one end (the left end as viewed in FIGS. 1 and 2) of the two frictional plates 58, 60 on the inner peripheral surface of the outer cylindrical portion 57, and a clutch piston 62 is provided for axial movement on the axial other end (the right end as viewed in FIGS. 1 and 2) of the two frictional plates 58, 60 inside the clutch case 55. The clutch 52 for low speed constructed as described above is connected by the feeding-in of pressurized oil through a supply and discharge hole 63 formed in the first sleeve 51, and is disconnected by the discharge of the same oil in the same way.

Also, the first sleeve 51 and the output disc 4 are connected together so as to be capable of transmitting a rotational force by a first power transmitting mechanism 41. This first power transmitting mechanism 41 is comprised of a first driving gear 64 spline-engaged with the output disc 4, a first driven gear 65 spline-engaged with the periphery of the first sleeve 51, and an idle gear 66 meshing with the first driving gear 64 and the first driven gear 65. Accordingly, during the connection of the clutch 52 for low speed, the first sleeve 51 and the carrier 39 are rotated in the same direction as the output disc 4 at a speed conforming to the ratio of the number of teeth between the first driving gear 64 and the first driven gear 65, with the rotation of the output disc 4.

On the other hand, the input shaft 15 and the ring gear 42 can be connected together so as to be capable of transmitting the rotational force through a second power transmitting mechanism 43 and a clutch 67 for high speed. The second power transmitting mechanism 43 is comprised of a second driving gear 68 spline-engaged with the intermediate portion of the input shaft 15 and held down by the loading nut 46, and a second driven gear 69 supported around the output shaft 36 for rotation relative to this output shaft 36, the second driving gear 68 and the second driven gear 69 being in meshing engagement with each other. In order to provide the second driven gear 69, a second sleeve 70 is rotatably supported around the output shaft 36 by a pair of radial bearings 71, 71 and a pair of thrust bearings 72, 72 which are rolling bearings such as needle bearings. Such a second sleeve 70 is rotated in a direction opposite to the direction of rotation of the input shaft 15 at a speed conforming to the ratio of the number of teeth between the second driving gear 68 and the second driven gear 69, with the rotation of the input shaft 15. The ratio $\beta/\alpha$ between the deceleration ratio $\alpha$ of the first power transmitting mechanism 41 and the deceleration ratio $\beta$ of the second power transmitting mechanism 43 is substantially equal to the deceleration ratio $i_H$ during the maximum acceleration of the toroidal type continuously variable transmission 34 (the deceleration ratio of e.g. the order of 0.5 between the input disc 2 and the output disc 4 in the state shown in FIG. 4). If for example, $\alpha=1$, $\beta\cong i_H$. The reason for this is that during the changeover between the low-speed mode and the high-speed mode which will be described later, the transmission gear ratio of the entire continuously variable transmission apparatus is prevented from becoming discontinuous or the degree thereof is reduced.

The clutch 67 for high speed which is a wet type multiplate clutch is provided with a cylinder 73 and a support ring 74 which are fixed to the outer peripheral surface of the second sleeve 70. Outer frictional plates 76, 76 spline-engaged with the inner peripheral surface of an outer cylinder portion 75 formed on the ring gear 42 and inner frictional plates 78, 78 spline-engaged with the outer peripheral surface of an inner cylinder portion 77 formed on the outer peripheral edge portion of the support ring 74 are axially alternately disposed. Further, a fixed plate 79 is fixed to an axial end (the right end as viewed in FIGS. 1 and 2) of the frictional plates 76, 78 on the inner peripheral surface of the outer cylinder portion 75, and a clutch piston 80 is axially movably provided inside the cylinder 73 located on the opposite side to the cylinder 73 with respect to the frictional plates 76, 78. The clutch 67 for high speed constructed as described above is connected by the feeding-in of pressurized oil through a supply and discharge hole 81 formed in the second sleeve 70, and is disconnected by the discharge of the pressurized oil in the same way.

The continuously variable transmission apparatus of the present invention is provided with changeover means for changing over among three modes, i.e., the high-speed running mode, the low-speed running mode and the receding mode. In the illustrated embodiment, this changeover means is comprised of three clutches, i.e., the above-described clutch 67 for high speed and the aforedescribed clutch 52 for low speed and a clutch 82 for receding. This clutch 82 for receding, which also is a wet type multiplate clutch, is provided with a circular ring-like cylinder 84 of U-shaped cross-section fixed to the inside of a housing 83 containing the continuously variable transmission apparatus therein, and a circular ring-like clutch piston 85 fitted in the cylinder 84. Inner frictional plates 86, 86 spline-engaged with the outer peripheral surface of the ring gear 42 and outer frictional plates 87, 87 spline-engaged with the inner peripheral surface of a portion fixed to the housing 84 are axially alternately disposed. Also, a fixed plate 88 is provided on the opposite side to the clutch piston 85 with respect to the frictional plates 86, 87, and the frictional plates 86, 87 can be sandwiched from the axially opposite sides by and between the clutch piston 85 and the fixed plate 88. The clutch 82 for receding constructed as described above is connected by the feeding of pressurized oil into the cylinder 84, and is disconnected by the discharge of the pressurized oil in the same way.

These three clutches 67, 52 and 82 are such that as will be described later, only one of them is connected and the remaining two clutches are disconnected in conformity with the mode to be realized. The aforedescribed clutch 52 for low speed, during its connection, prevents the gears 38, 42, 49a and 49b constituting the planetary gear mechanism 37 from being displaced relative to one another, and rotates the carrier 39 and the sun gear 38 in synchronism with each other. For this purpose, the clutch 52 for low speed is provided at a position capable of preventing the relative displacement of the constituent members of the planetary gear mechanism 37 with the connection thereof. In the illustrated embodiment, the clutch 52 for low speed is provided. between the carrier 39 and the sun gear 38. Such a clutch 52 for low speed, during its connection, prevents the relative displacement of the sun gear 38, the ring gear 42 and the set of planetary gears 48, 48 constituting the planetary gear mechanism 37, and integrally couples the sun gear 38, the ring gear 42 and the carrier 39 supporting the set of planetary gears 48, 48 together. The clutch 67 for high speed and the clutch 52 for low speed together constitute a control circuit (oil pressure and electricity) so that when one of these two clutches is connected, the other clutch may be disconnected. The clutch 52 for low speed can be any one which, during its connection, can prevent the relative displacement of the sun gear 38, the ring gear 42 and the set of planetary gears 48, 48, and can be provided not only at the location as shown, but between the sun gear 38 and the ring gear 42 or between the ring gear 42 and the carrier 39.

Also, the clutch 82 for receding is disconnected in a state in which one of the clutch 52 for low speed and the clutch 67 for high speed is connected. In a state in which this clutch 82 for receding is connected, both of the clutch 52 for low speed and the clutch 67 for high speed are disconnected. That is, the three remaining clutches 52, 67 and 82 except the starting clutch, not shown, are such that when one of them is connected, the remaining two clutches are disconnected.

Further, the output shaft 36 and the differential gear 35 are connected together by a third power transmitting mechanism 91 comprised of a third driving gear 89 and a third driven gear 90 which are fixed to the end portion of the output shaft 36. Accordingly, when the output shaft 36 is rotated, a pair of left and right driving axles 92, 92 are rotated through the third power transmitting mechanism 91 and the differential gear 35 to thereby rotatively drive the driving wheels of an automobile.

The structure of each constituent portion of the continuously variable transmission apparatus of the present invention is as described above, and particularly in the case of the continuously variable transmission apparatus of the present invention, the disposition of each constituent member is determined to achieve compactness and light weight. Firstly, the toroidal type continuously variable transmission 34 is disposed around a half (the right half as viewed in FIG. 1) of the input shaft 15, whereby this toroidal type continuously variable transmission 34 is disposed concentrically with this input shaft 15. Also, this input shaft 15 is disposed coaxially with the driving shaft 33. Accordingly, the toroidal type continuously variable transmission 34 is disposed coaxially with this driving shaft 33. Also, the output shaft 36 which is the central shaft of the planetary gear mechanism 37 is provided at a position obliquely above the input shaft 15.

Secondly, a cylinder block 93 containing therein the driving cylinders 31, 31 for axially (vertically as viewed in FIG. 3) displacing the trunnions 6, 6 to change the transmission gear ratio of the toroidal type continuously variable transmission 34 and a valve body 94 containing therein a control valve for controlling the supply and discharge of pressurized oil to and from these driving cylinders 31, 31 are disposed above the input shaft 15.

Thirdly, an idler gear 66 is provided intermediately of the first power transmitting mechanism 41 to make the directions of rotation of the input shaft 15 and the output shaft 36 coincident with each other, and an idle shaft 95 supporting this idle gear 66 is disposed in a state in which it extends through the boundary portion between the cylinder block 93 and the valve body 94.

The action of the continuously variable transmission apparatus of the present embodiment constructed as described above is as follows. First, during the low-speed running, the clutch 52 for low speed is connected and the clutch 67 for high speed and the clutch 82 for receding are disconnected. When in this state, the starting clutch is connected to thereby rotate the input shaft 15, only the toroidal type continuously variable transmission 34 transmits the motive power from the input shaft 15 to the output shaft 36. That is, with the connection of the clutch 52 for low speed, the sun gear 38 and the carrier 39 are integrally coupled together, and the relative rotation of the gears 38, 42, 49a and 49b constituting the planetary gear mechanism 37 becomes impossible. Also, by the clutch 67 for high speed and the clutch 82 for receding being disconnected, the ring gear 42 becomes rotatable independently of the rotational speed of the input shaft 15.

Accordingly, when in this state, the input shaft 15 is rotated, this rotation is transmitted to the input disc 2 through the pressing device 9, and is further transmitted to the output disc 4 through the plurality of power rollers 8, 8. Further, the rotation of this output disc 4 is transmitted to the carrier 39 and the planetary gears 49a, 49b through the first driving gear 64, the idler gear 66, the first driven gear 65, the first sleeve 51 and the clutch 52 for low speed which together constitute the first power transmitting mechanism 41. As described above, in this state, the relative rotation of the gears 38, 42, 49a and 49b constituting the planetary gear mechanism 37 is impossible and therefore, the output shaft 36 is rotated at the same speed as the carrier 39.

The action when the transmission gear ratio between the input and output discs 2 and 4 is changed during such low-speed running is similar to that in the case of the prior-art toroidal type continuously variable transmission shown in FIGS. 6 to 9. Of course, in this state, the transmission gear ratio between the input shaft 15 and the output shaft 36, i.e., the transmission gear ratio of the entire continuously variable transmission apparatus, is proportional to the transmission gear ratio of the toroidal type continuously variable transmission 34. Also, in this state, the torque inputted to this toroidal type continuously variable transmission 34 becomes equal to the torque applied to the input shaft 15. During the low-speed running, the second driving gear 68 and the second driven gear 69 constituting the second power transmitting mechanism 43 are only idly rotated.

In contrast, during the high-speed running, the clutch 67 for high speed is connected and the clutch 52 for low speed and the clutch 82 for receding are disconnected. When in this state, the starting clutch is connected to thereby rotate the input shaft 15, the second driving gear 68 and the second driven gear 69 constituting the second power transmitting mechanism 43 and the planetary gear mechanism 37 transmit motive power from the input shaft 15 to the output shaft 36.

That is, when the input shaft 15 is rotated during the high-speed running, this rotation is transmitted to the ring gear 42 through the second power transmitting mechanism 43 and the clutch 67 for high speed to thereby rotate this ring gear 42. The rotation of this ring gear 42 is transmitted to the sun gear 38 through the plurality of sets of planetary gears 48, 48 to thereby rotate the output shaft 36 to which the sun gear 38 is secured. Assuming that when the ring gear 42 has become the input side, the planetary gear mechanism 37 is such that the sets of planetary gears 48, 48 are stopped (do not revolve around the sun gear 38), acceleration is effected at a transmission gear ratio conforming to the ratio of the number of teeth between the ring gear 42 and the sun gear 38. However, the sets of planetary gears 48, 48 revolve around the sun gear 38, and the transmission gear ratio as the entire continuously variable transmission apparatus changes in conformity with the speed of revolution of the sets of planetary gears 48, 48. So, if the transmission gear ratio of the toroidal type continuously variable transmission 34 is changed to thereby change the speed of revolution of the sets of planetary gears 48, 48, the transmission gear ratio of the entire continuously variable transmission apparatus can be adjusted.

That is, in the illustrated embodiment, during the high-speed running, the sets of planetary gears 48, 48 revolve in the same direction as the ring gear 42. The lower is the speed of revolution of these sets of planetary gears 48, 48, the higher becomes the rotational speed of the output shaft 36 to which the sun gear 38 is fixed. If for example, the speed of revolution and the rotational speed of the ring gear 42 (both speeds are angular speeds) become equal to each other, the rotational speed of the ring gear 42 and the rotational speed of the output shaft 36 become equal to each other. In contrast, if the speed of revolution is lower than the rotational speed of the ring gear 42, the rotational speed of the output shaft 36 becomes higher than the rotational speed of the ring gear 42. If conversely, the speed of revolution is higher than the rotational speed of the ring gear 42, the rotational speed of the output shaft 36 becomes lower than the rotational speed of the ring gear 42.

Accordingly, during the high-speed running, as the transmission gear ratio of the toroidal type continuously variable transmission 34 is changed toward the deceleration side, the transmission gear ratio of the entire continuously variable transmission apparatus changes toward the acceleration side. In such a state of the high-speed running, torque is applied not from the input disc 2 side but from the output disc 4 side to the toroidal type continuously variable transmission 34 (minus torque is applied when the torque applied during the low-speed running is plus torque). That is, in a state in which the clutch 67 for high speed is connected, the torque transmitted from the engine 32 to the input shaft 15 is transmitted to the ring gear 42 of the planetary gear mechanism 37 through the second power transmitting device 43 before the pressing device 9 presses the input disc 2. Accordingly, the torque transmitted from the input shaft 15 side to the input disc 2 through the pressing device 9 becomes almost null.

On the other hand, part of the torque transmitted to the ring gear 42 of the planetary gear mechanism 37 through the second power transmitting mechanism 43 is transmitted from the sets of planetary gears 48, 48 to the output disc 4 through the carrier 39 and the first power transmitting mechanism 41. The torque thus applied from the output disc 4 side to the toroidal type continuously variable transmission 34 becomes smaller as the transmission gear ratio of the toroidal type continuously variable transmission 34 is changed toward the deceleration side to change the transmission gear ratio of the entire continuously variable transmission apparatus toward the acceleration side. As a result, the torque inputted to the toroidal type continuously variable transmission 34 during the high-speed running can be made small to thereby improve the durability of the constituent parts of this toroidal type continuously variable transmission 34.

Further, when the output shaft 36 is to be reversely rotated to make the automobile recede, the clutch 52 for low speed and the clutch 67 for high speed are disconnected and the clutch 82 for receding is connected. As the result, the ring gear 42 is fixed and the sets of planetary gears 48, 48 revolve around the sun gear 38 while meshing with the ring gear 42 and the sun gear 38. As the result, the sun gear 38 and the output shaft 36 to which the sun gear 38 is fixed are rotated in the direction opposite to that during the aforedescribed high-speed running and during the above-described low-speed running.

Figure 4:
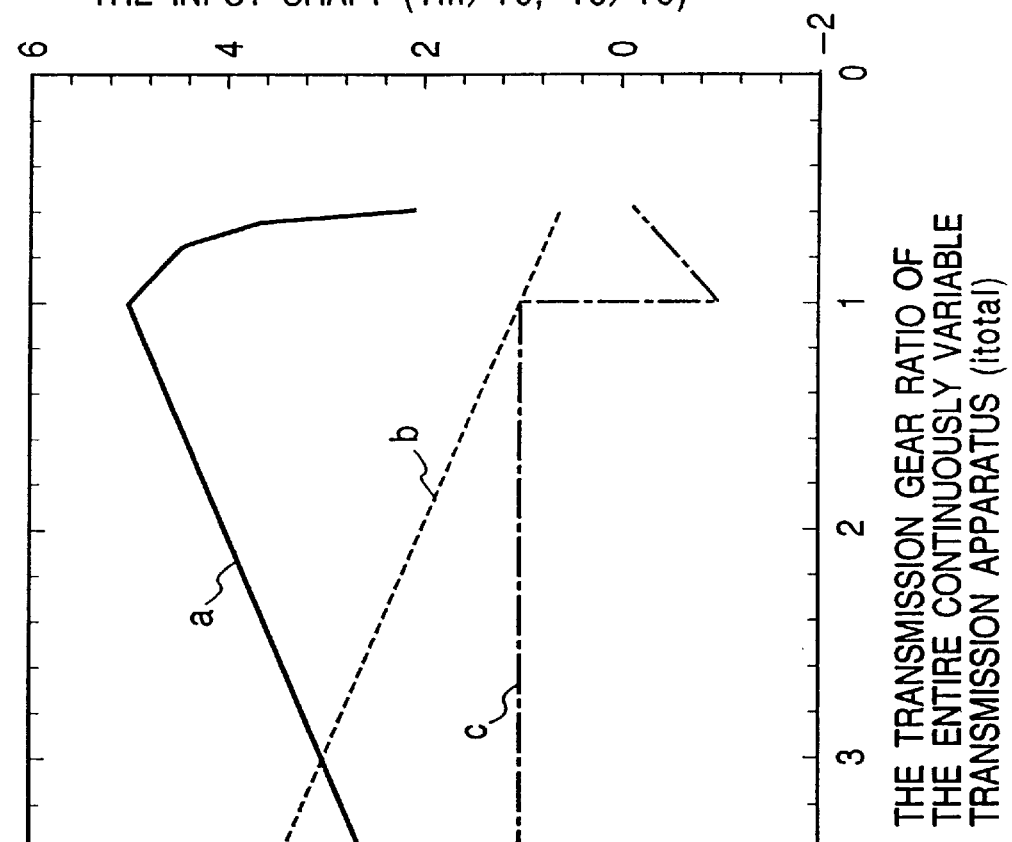
FIG. 4 is a graph showing the relations among the transmission gear ratio of a toroidal type continuously variable transmission in the first embodiment of the present invention, the transmission gear ratio of an entire continuously variable transmission apparatus, input torque and output torque.

FIG. 4 shows an example of the state in which the transmission gear ratio (icvt) of the toroidal type continuously variable transmission 34, the input torque ($T_{in}$) inputted to this toroidal type continuously variable transmission 34 and the output torque ($T_s$) taken out from the output shaft 36 of the continuously variable transmission apparatus change when the transmission gear ratio (itotal) of the entire continuously variable transmission apparatus is continuously changed. The relations among these transmission gear ratios (itotal) and (icvt) and the torque ($T_{in}$) and the torque ($T_s$) change in conformity with the speed change width of the toroidal type continuously variable transmission 34, the structure and the ratio of the number of teeth of the planetary gear mechanism 37 and the reduction ratio of the second power transmitting mechanism 43. When the present invention is carried out, these values and the structure are defined in terms of design. As the conditions for obtaining each line described in FIG. 4, the speed change width of the toroidal type continuously variable transmission 34 was about 4 times (0.5 to 2.0), and the planetary gear mechanism 37 was provided with sets of planetary gears 48, 48 each comprising a pair of planetary gears 49a, 49b, and the reduction ratio of the second power transmitting mechanism 43 was calculated as being about 2. Also, the changeover of the clutch 52 for low speed and the clutch 67 for high speed was effected when the transmission gear ratio (itotal) of the entire continuously variable transmission apparatus was 1.

When an actual continuously variable transmission apparatus is to be constructed, if design is made such that the changeover of the clutch 52 for low speed and the clutch 67 for high speed is effected whenever the transmission gear ratio (itotal) as the entire continuously variable transmission apparatus is 1, the changeover of these clutches 52 and 67 is frequently effected when the automobile is running at the above-mentioned transmission gear ratio (itotal) of about 1. Such a situation not only gives a feeling of physical disorder to the driver, but also adversely affects the durability of these clutches 52 and 67. Accordingly, when an actual continuously variable transmission apparatus is to be constructed, provision is made of the so-called hysteresis of changing the timing of the changeover of the clutches 52 and 67 when the above-mentioned transmission gear ratio (itotal) becomes high and when it becomes low. For example, the timing of the changeover when the value of the transmission gear ratio (itotal) becomes small (the value of the transmission gear ratio changes from the left to right in FIG. 4) is defined as a point of time at which the value of the transmission gear ratio is smaller (the right side in FIG. 4) than that at the timing of the changeover when this value becomes greater (the value of the transmission gear ratio changes from the right to left in FIG. 4).

In FIG. 4 which shows the result of the trial calculation effected under the conditions as described above, the axis of ordinates represents the ratio ($T_{in}/T_e$) ($T_s/T_e$) among the transmission gear ratio (icvt) of the toroidal type continuously variable transmission 34 and the input torque ($T_{in}$) of the toroidal type continuously variable transmission 34 or the output torque ($T_s$) of the continuously variable transmission apparatus and the torque ($T_e$) transmitted from the engine 32 (FIG. 11) to the input shaft 15, and the axis of abscissas represents the transmission gear ratio (itotal) of the entire continuously variable transmission apparatus. It is because the direction of rotation of the output disc 4 incorporated in the toroidal type continuously variable transmission 34 is opposite to the direction of rotation of the input shaft 15 that the value indicative of the transmission gear ratio (icvt) of the toroidal type continuously variable transmission 34 is minus. Also, solid line a represents the transmission gear ratio (icvt) of the toroidal type continuously variable transmission 34, broken line b represents the ratio $(T_s/T_e)$ between the output torque $(T_s)$ and the torque $(T_e)$ transmitted from the engine 32 to the input shaft 15, and dot-and-dash line c represents the ratio $(T_{in}/T_e)$ between the input torque $(T_{in})$ and the torque $(T_e)$ transmitted from the engine 32 to the input shaft 15. As is apparent from such showing of FIG. 4, according to the continuously variable transmission apparatus of the present invention, the torque applied to the toroidal type continuously variable transmission 34 during the high-speed running can be made small. Under the conditions under which FIG. 4 was obtained, the input torque $(T_{in})$ can be reduced to the order of 14%, at maximum, of the torque $(T_e)$ transmitted from the engine 32 to the input shaft 15. Further, by changing the conditions, it is possible to reduce the input torque $(T_{in})$ to the order of 10%.

The transmission efficiency of the toroidal type continuously variable transmission 34 is a little less than 90%, but during the high-speed running, most of the motive power is transmitted through the planetary gear mechanism 37 of which the transmission efficiency is high (approximate to 100%) and therefore the transmission efficiency of the entire continuously variable transmission apparatus can be increased. When for example, the transmission efficiency of the toroidal type continuously variable transmission is 90% (the power loss is 10%) and the transmission efficiency of the planetary gear mechanism 37 is 100% and the percentage of that part of the torque introduced from the input shaft 15 which passes through the toroidal type continuously variable transmission 34 is 10%, the power loss in this toroidal type continuously variable transmission 34 is 0.1× 0.1=0.01=1%, and the transmission efficiency of the entire continuously variable transmission apparatus becomes as high as 100−1=99 (%).

Also, in the case of the continuously variable transmission apparatus of the present invention, the toroidal type continuously variable transmission 34 is disposed coaxially with the input shaft 15 and the central shaft of the planetary gear mechanism 37 is disposed obliquely above the input shaft 15 and therefore, each constituent member can be efficiently disposed to thereby achieve the compactness and light weight of the continuously variable transmission apparatus. That is, the input shaft 15 which provides the central shaft of the toroidal type continuously variable transmission 34 of which the cross-sectional area with respect to a vertical plane present in a direction perpendicular to the central shaft increases and the output shaft 36 which provides the central shaft of the planetary gear mechanism 37 are disposed in directions deviating from each other with respect to the horizontal direction and the vertical direction. Therefore, the width and height of the continuously variable transmission apparatus including the toroidal type continuously variable transmission 34 and the planetary gear mechanism 37 can be made small. Also, the idle gear 66 and the idle shaft 95 can be disposed above the toroidal type continuously variable transmission 34 and sideways of the planetary gear mechanism 37, and the third driving gear 89 and third driven gear 90 which form the output portion connected to the differential gear 35 can be disposed below the end portion of the planetary gear mechanism 37 and therefore, the effective utilization of space can be achieved.

Also, the cylinder block 93 containing the driving cylinders 31, 31 therein and the valve body 94 containing therein a control valve for controlling the supply and discharge of pressurized oil to and from these driving cylinders 31, 31 are disposed above the input shaft 15 and therefore, the effective utilization of space can also be achieved.

Further, the idle shaft 95 supporting the idle gear 66 thereon is disposed in a state in which it extends through the boundary portion between the cylinder block 93 and the valve body 94 and therefore, again by the effective utilization of space, the compactness and light weight of the continuously variable transmission apparatus can be achieved.

The present invention is constructed and acts as described above and therefore, in spite of relatively simple, compact and light-weight structure which can be made at low cost, it can mitigate the load applied to the constituents of the toroidal type continuously variable transmission incorporated in the continuously variable transmission apparatus to thereby improve the durability thereof. Particularly, by the optimum disposition of each of the constituent members, the effective utilization of space can be achieved and the downsizing and lighter weight of the apparatus can be enhanced. Also, the transmission efficiency can be increased to thereby contribute to improvements in the motive power performance and fuel consumption performance of the automobile.

Second Embodiment

This embodiment, like the first embodiment, secures the durability of the toroidal type continuously variable transmission and achieves the compactness and lighter weight of the entire continuously variable transmission apparatus. This embodiment can realize structure which can achieve the mitigation of the torque transmitted through the toroidal type continuously variable transmission during the high-speed running and moreover can be made compact and light in weight, simply by incorporating a planetary gear mechanism.

Figure 5:
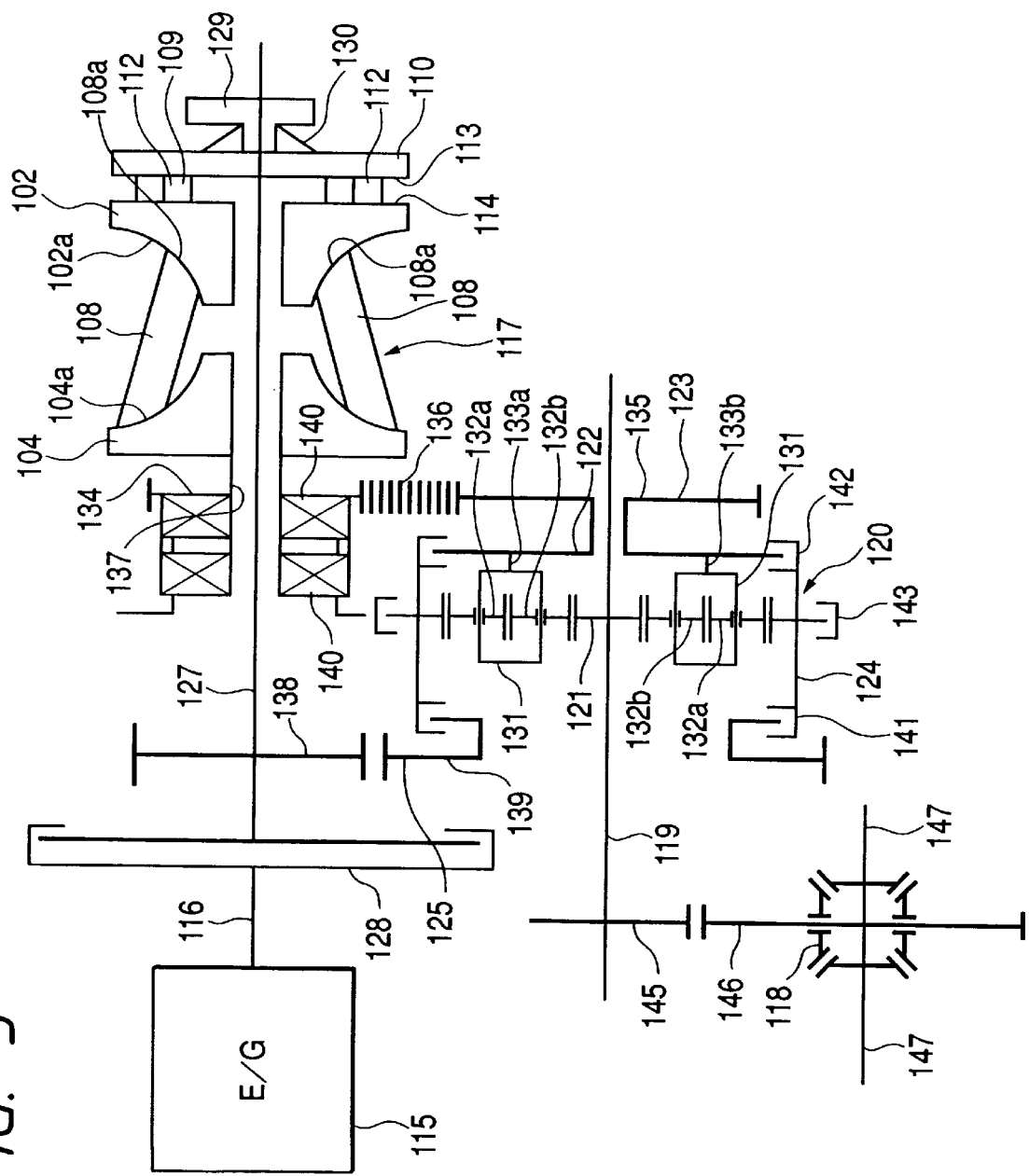
FIG. 5 schematically shows the construction of a second embodiment of the present invention.

FIG. 5 shows the second embodiment of the present invention. The continuously variable transmission apparatus of the present embodiment is provided with an input shaft 127 connected to the driving shaft 116 (crank shaft) of an engine 115 and rotatively driven by this engine 115. A starting clutch 128 such as a torque converter is provided between the input side end portion (the left end portion as viewed in FIG. 5) of the input shaft 127 and the output side end portion (the right end portion as viewed in FIG. 5) of the driving shaft 116 in series with the driving shaft 116 and the input shaft 127. Thus, the driving shaft 116 and the input shaft 127 are disposed coaxially with each other. In contrast, an output shaft 119 for taking out motive power based on the rotation of the input shaft 127 is disposed parallel to the input shaft 127. A toroidal type continuously variable transmission 117 is provided around the input shaft 127, and a planetary gear mechanism 120 is provided around the output shaft 119.

A cam plate 110 of a pressing device 109 of a loading cam type belonging to the toroidal type continuously variable transmission 117 is supported on that portion of the intermediate portion of the input shaft 127 which is toward one end (the right end as viewed in FIG. 5) and protrudes from the outer side (the right side as viewed in FIG. 5) of an input disc 102. A spline or the like is provided on the engaged portion between the inner peripheral surface of the cam plate 110 and the outer peripheral surface of the input shaft 127 so that the axial movement of the cam plate 110 relative to the input shaft 127 may be made possible and yet the cam plate 110 may be rotated in synchronism with the input shaft 127. Also, the input disc 102 and an output disc 104 of the toroidal type continuously variable transmission 117 are supported around the input shaft 127 for independent rotation relative to the input shaft 127 by bearings, not shown, such as needle bearings. Rollers 112, 112 are sandwiched between a cam surface 113 formed on one surface (the left surface as viewed in FIG. 5) of the cam plate 110 and a cam surface 114 formed on the outer side of the input disc 102 to thereby constitute the pressing device 109. Accordingly, with the rotation of the input shaft 127, the input disc 102 is rotated while being urged toward the output disc 104. Also, a loading nut 129 is threadably engaged with one end portion of the input shaft 127 which protrudes beyond the cam plate 110, whereby a great thrust load applied to the cam plate 110 during the operation of the pressing device 109 is made supportable. Also, a preload spring 130 such as a belleville spring is provided between the cam plate 110 and the loading nut 129 to impart a preload to the pressing device 109 and power rollers 108, 108 which are sandwiched between the input disc 102 and the output disc 104.

A plurality of (usually two to three) power rollers 108, 108 are sandwiched between the inner side 102a of the input disc 102 and the inner side 104a of the output disc 104, and the peripheral surfaces 108a, 108a of these power rollers 108, 108 and the above-mentioned inner sides 102a and 104a are brought into contact with each other. These power rollers 108, 108 are rotatably and pivotally supported by trunnions, and displaceable shafts (see FIGS. 6 and 7, and not shown in FIG. 5). The toroidal type continuously variable transmission 117, like the heretofore widely known toroidal type continuously variable transmission, changes the transmission gear ratio between the input disc 102 and the output disc 104 by pivotally moving the trunnions to thereby change the angle of inclination of the displaceable shafts supporting the power rollers 108, 108.

Also, a sun gear 121 of the planetary gear mechanism 120 is fixed to the intermediate portion of the output shaft 119. Accordingly, this output shaft 119 is rotated with the rotation of the sun gear 121. Around this sun gear 121, a ring gear 124 is rotatably supported concentrically with the sun gear 121. A plurality of (usually three to four) sets of planetary gears 131, 131 are provided between the inner peripheral surface of the ring gear 124 and the outer peripheral surface of the sun gear 121. In the illustrated embodiment, each of these sets of planetary gears 131, 131 comprises a combination of a pair of planetary gears 132a, 132b. Each pair of planetary gears 132a, 132b mesh with each other, and the planetary gear 132a disposed on the outer diameter side is brought into meshing engagement with the ring gear 124 and the planetary gear 132b disposed on the inner diameter side is brought into meshing engagement with the sun gear 121. It is for making the directions of rotation of the ring gear 124 and the sun gear 121 coincident with each other that, as described above, each set of planetary gears 131, 131 is comprised of a pair of planetary gears 132a, 132b. Accordingly, if from the relation with the other constituent portions, it is not necessary to make the directions of rotation of the ring gear 124 and the sun gear 121 coincident with each other, a single planetary gear may be brought into meshing engagement with both of the ring gear 124 and the sun gear 121.

The sets of planetary gears 131, 131 as described above are rotatably supported on one side (the left side as viewed in FIG. 5) of a carrier 122 by pivot shafts 133a, 133b parallel to the output shaft 119. Also, the carrier 122 is rotatably supported on the intermediate portion of the output shaft 119 by a bearing, not shown, such as a needle bearing.

Also, the carrier 122 and the output disc 104 are connected together so as to be capable of transmitting a rotational force, by a first power transmitting mechanism 123. This first power transmitting mechanism 123 is comprised of first and second sprockets 134 and 135 and a chain 136 passed over these two sprockets 134 and 135. That is, the first sprocket 134 is fixed to a sleeve 137 having the output disc 104 coupled and fixed thereto and rotatable with the output disc 104, and the second sprocket 135 is fixed to the carrier 122. Accordingly, this carrier 122 is rotated in the same direction as the output disc 104 with the rotation of the output disc 104 at a speed conforming to the ratio between the numbers of teeth of the first and second sprockets 134 and 135. The sleeve 137 is supported for only rotation inside a casing incorporating the continuously variable transmission apparatus therein, by a pair of rolling bearings 140, 140 such as angular ball bearings capable of supporting a radial load and a thrust load.

On the other hand, the input shaft 127 and the ring gear 124 can be connected together so as to be capable of transmitting the rotational force, by a second power transmitting mechanism 125. This second power transmitting mechanism 125 is comprised of first and second gears 138 and 139 meshing with each other. That is, the first gear 138 is fixed on that portion of the input shaft 127 which is toward the input side end of the intermediate portion thereof at a position axially opposite to the first power transmitting mechanism 123 with respect to the pair of rolling bearings 140, 140. Also, the second gear 139 is supported concentrically with the ring gear 124 for rotation independently of this ring gear 124. Such a second gear 139 is rotated in the direction opposite to the direction of rotation of the input shaft 127 with the rotation of this input shaft 127, at a speed conforming to the ratio between the numbers of teeth of the first and second gears 138 and 139. The ratio $\beta/\alpha$ between the reduction ratio $\alpha$ of the first power transmitting mechanism 123 and the reduction ratio $\beta$ of the second power transmitting mechanism 125 is substantially equal to the reduction ratio $i_H$ of the toroidal type continuously variable transmission 117 during the maximum acceleration thereof (the reduction ratio of e.g. about 0.5 between the input disc 102 and the output disc 104 in the state shown in FIG. 4). If for example, $\alpha=1$, $\beta \cong i_H$. This is for preventing the transmission gear ratio of the entire continuously variable transmission apparatus from becoming discontinuous or reducing the degree thereof during the changeover of the low-speed mode and the high-speed mode which will be described later.

Also, the continuously variable transmission apparatus of the present embodiment is provided with changeover means for changing over among three modes, i.e., the high-speed running mode, the low-speed running mode and the receding mode. In the illustrated embodiment, this changeover means is comprised of three clutches, i.e., a clutch 141 for high speed which is a first clutch, a clutch 142 for low speed which is a second clutch, and a clutch 143 for receding. These three clutches 141, 142 and 143 are such that as will be described later, only one of them is connected and the remaining two clutches are disconnected in conformity with the mode to be realized. The clutch 141 for high speed is provided between the second gear 139 and the ring gear 124 constituting the second power transmitting mechanism 125, and during the connection thereof, it rotates the second gear 139 and the ring gear 124 in synchronism with each other.

Also, the clutch 142 for low speed, during the connection thereof, prevents the gears 121, 124, 132a and 132b constituting the planetary gear mechanism 120 from being displaced relative to one another, and rotates the carrier 122 and the sun gear 121 in synchronism with each other. For this purpose, the clutch 142 for low speed is provided at a position whereat with the connection thereof, it can prevent the relative displacement of the constituent members of the planetary gear mechanism 120. In the illustrated embodiment, the clutch 142 for low speed is provided between the carrier 122 and the ring gear 124. Such a clutch 142 for low speed, during the connection thereof, prevents the relative displacement of the sun gear 121, the ring gear 124 and the sets of planetary gears 131, 131 constituting the planetary gear mechanism 120, and integrally couples the sun gear 121, the ring gear 124 and the carrier 122 supporting the sets of planetary gears 131, 131 together. The clutch 141 for high speed and the clutch 142 for low speed together constitute a control circuit (oil pressure and electricity) so that when one of them is connected, the other clutch may be disconnected. The clutch 142 for low speed can be any one which, as described above, during the connection thereof, can prevent the relative displacement of the sun gear 121, the ring gear 124 and the sets of planetary gears 131, 131, and can be provided not only at the region as shown, but also between the sun gear 121 and the ring gear 124 or between the sun gear 121 and the carrier 122.

Also, in the illustrated embodiment, the clutch 143 for receding is provided between the ring gear 124 and a fixed portion such as the housing of the continuously variable transmission apparatus. This clutch 143 for receding is provided to rotate the output shaft 119 in the opposite direction to make the automobile recede. This clutch 143 for receding is disconnected in a state in which one of the clutch 142 for low speed and the clutch 141 for high speed is connected. Also, in a state in which the clutch 143 for receding is connected, both of the clutch 142 for low speed and the clutch 141 for high speed are disconnected. That is, when the other three clutches 141, 142 and 143 than the starting clutch 128 are such that when one of them is connected, the remaining two clutches are disconnected.

Further, in the illustrated embodiment, the output shaft 119 and the differential gear 118 are connected together by a third power transmitting mechanism 146 comprised of a third gear 145 fixed to the end portion of the output shaft 119. Accordingly, when the output shaft 119 is rotated, a pair of left and right driving axles 147 and 147 are rotated through the third power transmitting mechanism 146 and the differential gear 144 to thereby rotatively drive the driving wheels of the automobile.

The action of the continuously variable transmission apparatus constructed as described above is as follows. First, during the low-speed running, the clutch 142 for low speed is connected and the clutch 141 for high speed and the clutch 143 for receding are disconnected. When in this state, the starting clutch 128 is connected to thereby rotate the input shaft 127, only the toroidal type continuously variable transmission 117 transmits motive power from the input shaft 127 to the output shaft 119. That is, with the connection of the clutch 142 for low speed, the ring gear 124 and the carrier 122 are integrally coupled together, and the relative rotation of the gears 121, 124, 132a and 132b constituting the planetary gear mechanism 120 becomes impossible. Also, the clutch 141 for high speed and the clutch 143 for receding are disconnected, whereby the ring gear 124 becomes rotatable independently of the rotational speed of the input shaft 127.

Accordingly, when in this state, the input shaft 127 is rotated, this rotation is transmitted to the input disc 102 through the pressing device 109, and is further transmitted to the output disc 104 through the plurality of power rollers 108, 108. Further, the rotation of this output disc 104 is transmitted to the carrier 122 and the ring gear 124 through the first and second sprockets 134 and 135 and the chain 136 which together constitute the first power transmitting mechanism 123. As described above, in this state, the relative rotation of the gears 121, 124, 132a and 132b constituting the planetary gear mechanism 120 is impossible and therefore, the output shaft 119 is rotated at the same speed as the carrier 122 and the ring gear 124.

Figure 6:
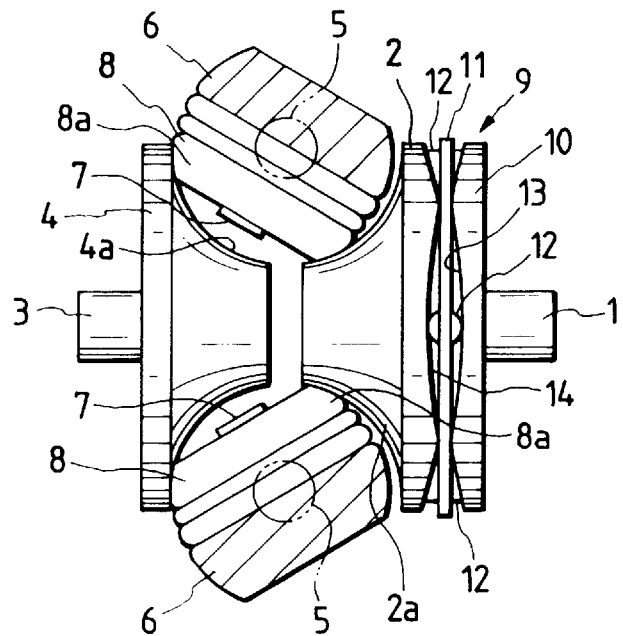
FIG. 6 is a side view partly in cross-section showing a heretofore known toroidal type continuously variable transmission in the state during maximum deceleration.
Figure 7:
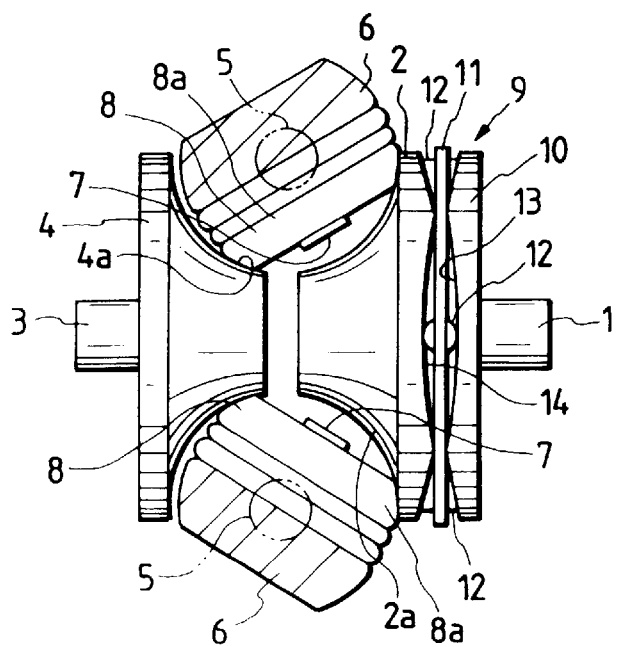
FIG. 7 is a side view partly in cross-section showing the heretofore known toroidal type continuously variable transmission in the state during maximum acceleration.
Figure 8:
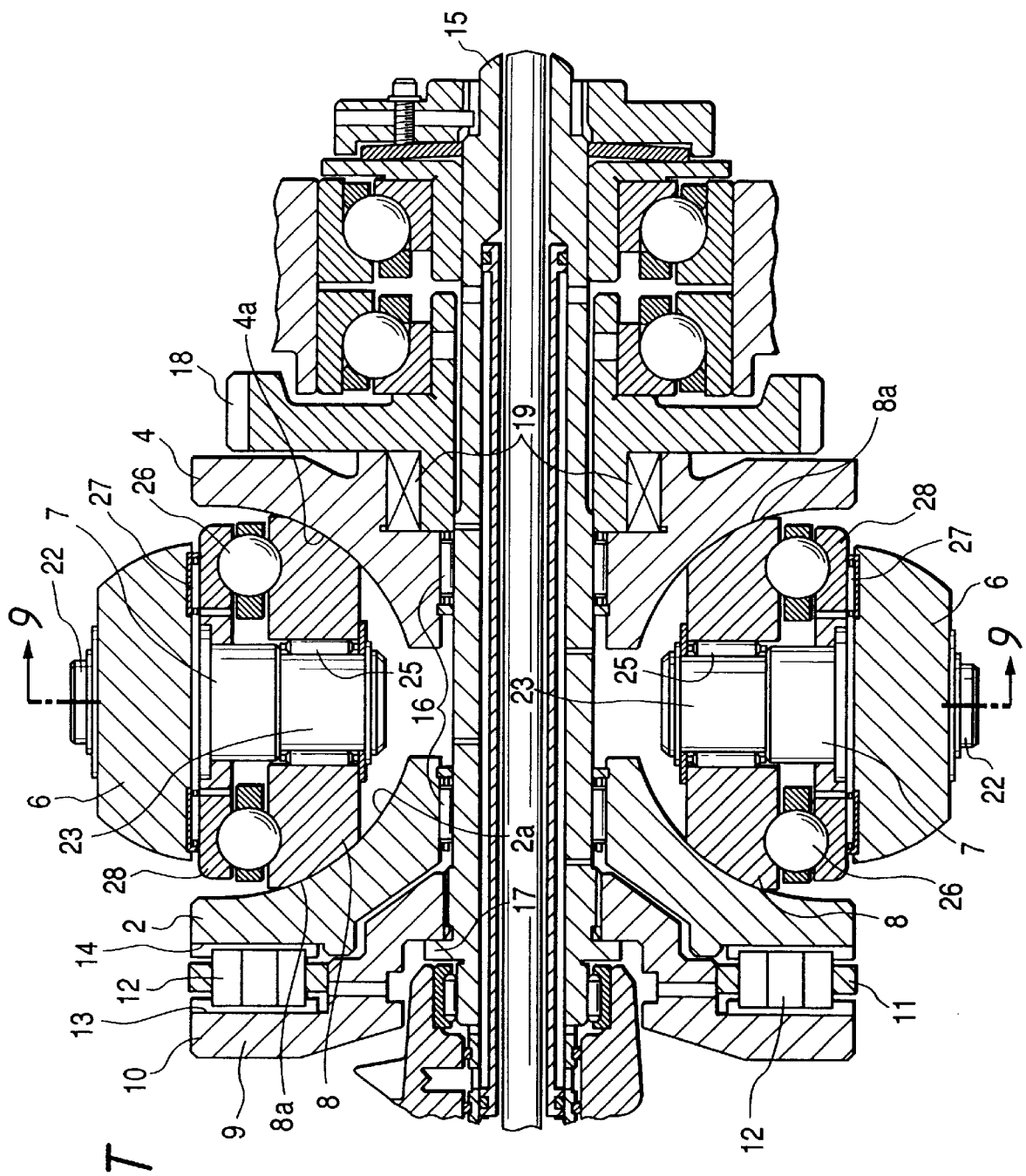
FIG. 8 is a cross-sectional view showing an example of the heretofore known specific structure.
Figure 9:
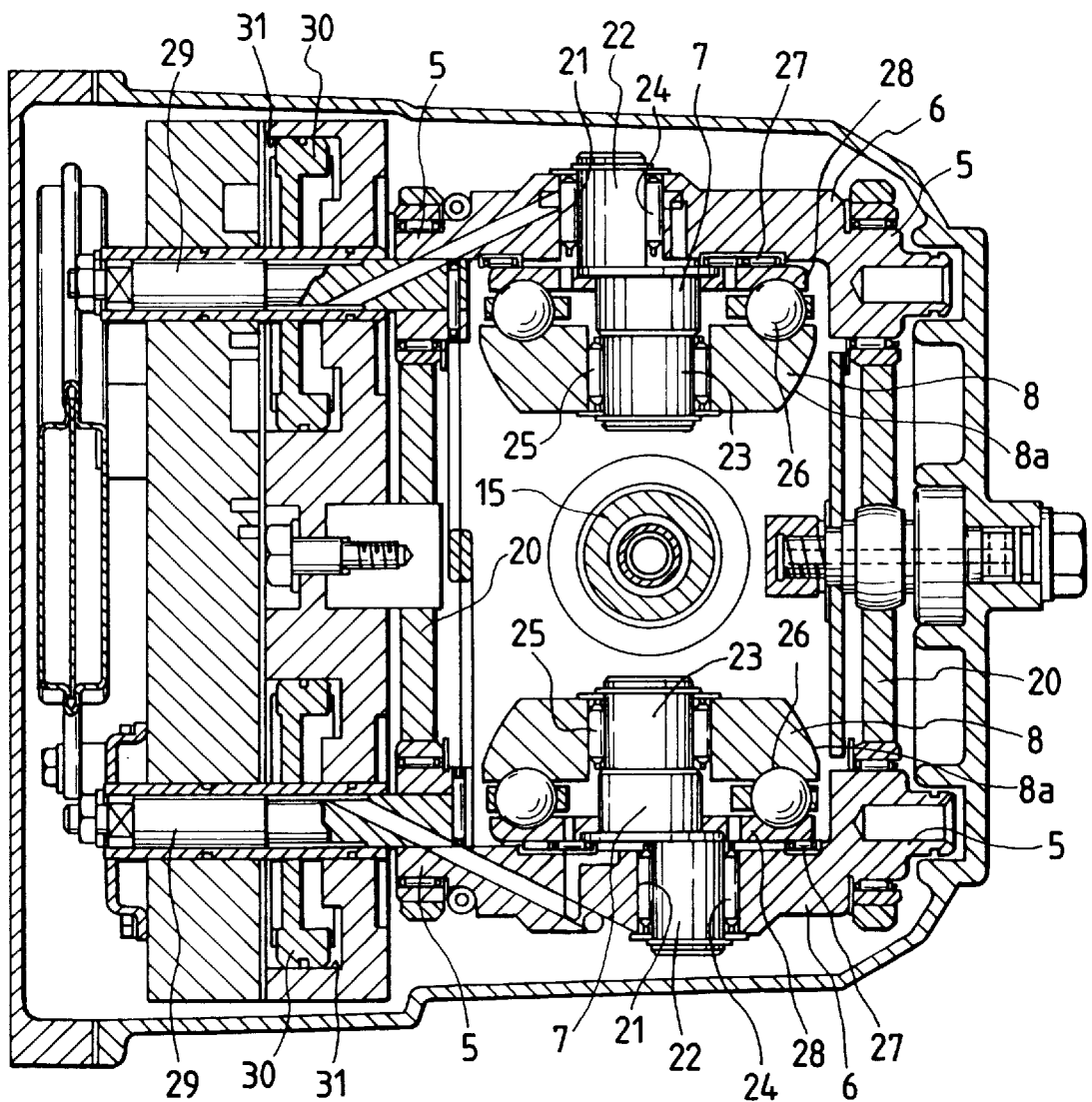
FIG. 9 is a cross-sectional view taken along the line 9—9 of FIG. 8.

The action when the transmission gear ratio between the input and output discs 102 and 104 is changed during such low-speed running is similar to that in the case of the prior-art toroidal type continuously variable transmission shown in FIGS. 6 and 7. Of course, in this state, the transmission gear ratio between the input shaft 127 and the output shaft 119, i.e., the transmission gear ratio of the entire continuously variable transmission apparatus, is proportional to the transmission gear ratio of the toroidal type continuously variable transmission 117. Also, in this state, the torque inputted to this toroidal type continuously variable transmission 117 becomes equal to the torque applied to the input shaft 127. During the low-speed running, the first and second gears 138 and 139 constituting the second power transmitting mechanism 125 are only idly rotated.

In contrast, during the high-speed running, the clutch 141 for high speed is connected and the clutch 142 for low speed and the clutch 143 for receding are disconnected. When in this state, the starting clutch 128 is connected to thereby rotate the input shaft 127, the first and second gears 138 and 139 constituting the second power transmitting mechanism 125 and the planetary gear mechanism 120 transmit motive power from the input shaft 127 to the output shaft 119.

That is, when the input shaft 127 is rotated during the high-speed running, this rotation is transmitted to the ring gear 124 through the second power transmitting mechanism 125 and the clutch 141 for high speed to thereby rotate this ring gear 124. The rotation of this ring gear 124 is transmitted to the sun gear 121 through the plurality of sets of planetary gears 131, 131 to thereby rotate the output shaft 119 to which the sun gear 121 is fixed. When the ring gear 124 has become the input side, assuming that the sets of planetary gears 131, 131 are stopped (do not revolve around the sun gear 121), the planetary gear mechanism 120 effects acceleration at a transmission gear ratio conforming to the ratio between the numbers of teeth of the ring gear 124 and the sun gear 121. However, the sets of planetary gears 131, 131 revolve around the sun gear 121, and the transmission gear ratio of the entire continuously variable transmission apparatus changes in conformity with the speed of revolution of the sets of planetary gears 131, 131. So, if the transmission gear ratio of the toroidal type continuously variable transmission 117 is changed to thereby change the speed of revolution of the sets of planetary gears 131, 131, the transmission gear ratio of the entire continuously variable transmission apparatus can be adjusted.

That is, in the illustrated embodiment, during the high-speed running, the sets of planetary gears 131, 131 revolve in the same direction as the ring gear 124. The lower the speed of revolution of these sets of planetary gears 131, 131, the higher becomes the rotational speed of the output shaft 119 to which the sun gear 121 is fixed. If for example, the speed of revolution and the rotational speed of the ring gear 124 (both being angular speeds) become equal to each other, the rotational speed of the ring gear 124 and the rotational speed of the output shaft 119 will become equal to each other. In contrast, if the speed of revolution is lower the rotational speed of the ring gear 124, the rotational speed of the output shaft 119 will become higher than the rotational speed of the ring gear 124. If conversely, the speed of revolution is higher than the rotational speed of the ring gear 124, the rotational speed of the output shaft 119 will become lower than the rotational speed of the ring gear 124.

Accordingly, during the high-speed running, the more the transmission gear ratio of the toroidal type continuously variable transmission 117 is changed toward the deceleration side, the more the transmission gear ratio of the entire continuously variable transmission apparatus is changed toward the acceleration side. In such a state during the high-speed running, torque is applied not from the input disc 102 side but from the output disc 104 side to the toroidal type continuously variable transmission 117 (when the torque applied during the low-speed running is plus torque, minus torque is applied). That is, in a state in which the clutch 141 for high speed is connected, the torque transmitted from the engine 115 to the input shaft 127 is transmitted to the ring gear 124 of the planetary gear mechanism 120 through the second power transmitting mechanism 125 before the pressing device 109 presses the input disc 102. Accordingly, the torque transmitted from the input shaft 127 side to the input disc 102 through the pressing device 109 becomes almost null.

On the other hand, part of the torque transmitted to the ring gear 124 of the planetary gear mechanism 120 through the second power transmitting mechanism 125 is transmitted from the sets of planetary gears 131, 131 to the output disc 104 through the carrier 122 and the first power transmitting mechanism 123. The torque thus applied from the output disc 104 side to the toroidal type continuously variable transmission 117 becomes smaller as the transmission gear ratio of the toroidal type continuously variable transmission 117 is changed toward the deceleration side to change the transmission gear ratio of the entire continuously variable transmission apparatus toward the acceleration side. As the result, the torque inputted to the toroidal type continuously variable transmission 117 during the high-speed running can be made small to thereby improve the durability of the constituent parts of this toroidal type continuously variable transmission 117.

Further, when in the structure shown in FIG. 5, the output shaft 119 is reversely rotated to make the automobile recede, the clutch 141 for low speed and the clutch 142 for high speed are disconnected and the clutch 143 for receding is connected. As the result, the ring gear 124 is fixed and the sets of planetary gears 131, 131 revolve around the sun gear 121 while meshing with the ring gear 124 and the sun gear 121. As the result, the sun gear 121 and the output shaft 119 to which the sun gear 121 is fixed are rotated in the direction opposite to that during the aforedescribed high-speed running and during the above-described low-speed running.

It will be seen that again in the present embodiment, as in the first embodiment, by using FIG. 4, the transmission efficiency of the entire continuously variable transmission apparatus becomes as high as 99%.

Further, the loading nut 129 is disposed on one end portion of the input shaft 127 and therefore, the work of fastening this loading nut 129 can be done easily. Also, the state of arrangement of the rollers 112, 112 of the pressing device 109 provided adjacent to the loading nut 129 can be confirmed when this loading nut 129 is threadably engaged and fastened. Accordingly, the work of properly assembling the continuously variable transmission apparatus can be done easily.

The present invention is constructed and acts as described above and therefore in spite of its relatively simple, compact and light-weight structure which can be made at low cost, the load applied to the constituent parts of the toroidal type continuously variable transmission incorporated in the continuously variable transmission apparatus can be mitigated to thereby improve the durability of the apparatus. Particularly, the rotary shaft of the planetary gear mechanism portion need not be made longer than necessary and the downsizing and lighter weight can be enhanced. Also, the transmission efficiency can be increased to thereby contribute to improvements in the motive power performance and fuel consumption performance of the automobile.

What is claimed is:

1. A continuously variable transmission apparatus including an input shaft connected to a drive source, an output shaft connected to a portion to be driven, a toroidal type continuously variable transmission in which an angle of inclination of a power roller sandwiched between an input disc and an output disc is changed to thereby change a transmission gear ratio between said input disc and said output disc, a planetary gear mechanism, a pair of power transmitting mechanisms arranged for connecting the toroidal type continuously variable transmission and the planetary gear mechanism together, and a changeover system operative to change a transmission state between said input shaft and said output shaft among a high-speed running mode, a low-speed running mode and a receding mode, wherein in the low-speed running mode, all motive power between said input shaft and said output shaft is transmitted through said toroidal type continuously variable transmission, and in the high-speed running mode, the motive power is transmitted by said planetary gear mechanism and some of the motive power is circulated to said toroidal type continuously variable transmission through said planetary gear mechanism, characterized in that said toroidal type continuously variable transmission is disposed coaxially with said input shaft, and a central shaft of said planetary gear mechanism is substantially parallel to said input shaft and disposed at an oblique angle from said input shaft with respect to a plane including an axis of said input shaft and a substantially perpendicular axis about which said power roller rotates in a neutral position.

2. A continuously variable transmission apparatus according to claim 1, wherein a cylinder block containing a driving cylinder for changing the transmission gear ratio of the toroidal type continuously variable transmission, and a valve body containing a control valve for controlling the supply and discharge of oil pressure to and from said driving cylinder are disposed off the plane and on the same side of the plane as is said central shaft.

3. A continuously variable transmission apparatus according to claim 2, wherein an idle gear is provided on and intermediate portion of one of the first power transmitting mechanism and the second power transmitting mechanism, and an idle shaft supporting said idle gear thereon is disposed in a state in which it extends through a portion of at least one of the cylinder block and the valve body.

4. A continuously variable transmission apparatus according to claim 1, wherein said toroidal type continuously variable transmission is a single cavity transmission.

5. A continuously variable transmission apparatus according to claim 4, wherein said portion to be driven includes a wheel-driving axle disposed on an opposite side of said plane from said central shaft of said planetary gear mechanism.

6. A continuously variable transmission apparatus according to claim 1, wherein said portion to be driven includes a wheel-driving axle disposed on an opposite side of said plane from said central shaft of said planetary gear mechanism.

7. A continuously variable transmission apparatus including an input shaft rotatively driven by a driving shaft, an output shaft which takes out motive power based on the rotation of said input shaft, a toroidal type continuously variable transmission, a planetary gear mechanism, said toroidal type continuously variable transmission being adapted to change an angle of inclination of a power roller sandwiched between an input disc and an output disc disposed coaxially with each other to thereby change a transmission gear ratio between said input disc and said output disc, said planetary gear mechanism comprising a planetary gear provided between a sun gear for rotating said output shaft and a ring gear disposed around said sun gear, and rotatably supported on a carrier rotatably supported coaxially with said sun gear, said planetary gear being in meshing engagement with said sun gear and said ring gear, said carrier and said output disc being connected together so as to be capable of transmitting a rotational force by a first power transmitting mechanism, said input shaft and said ring gear being capable of being connected together so as to transmit the rotational force by a second power transmitting mechanism, and a changeover system operative to change a transmission state between said input shaft and said output shaft among a high-speed running mode, a low-speed running mode and a receding mode, the ratio $\beta/\alpha$ between a reduction ratio $\alpha$ of said first power transmitting mechanism and a reduction ratio $\beta$ of said second power transmitting mechanism being substantially equal to a reduction ratio $i_H$ of said toroidal type continuously variable transmission in a maximum acceleration setting thereof, said toroidal type continuously variable transmission being disposed coaxially with said input shaft, a central shaft of said planetary gear mechanism being substantially parallel to said input shaft and disposed at an oblique angle from said input shaft with respect to a plane including an axis of said input shaft and a substantially perpendicular axis about which said power roller rotates in a neutral position.

8. A continuously variable transmission apparatus according to claim 2, wherein a cylinder block containing a driving cylinder for changing the transmission gear ratio of the toroidal type continuously variable transmission, and a valve body containing a control valve for controlling the supply and discharge of oil pressure to and from said driving cylinder are disposed off the plane and on the same side of the plane as is said central shaft.

9. A continuously variable transmission apparatus according to claim 8, wherein an idle gear is provided on the intermediate portion of one of the first power transmitting mechanism and the second power transmitting mechanism, and an idle shaft supporting said idle gear thereon is disposed in a state in which it extends through a portion of at least one of the cylinder block and the valve body.

10. A continuously variable transmission apparatus according to claim 2, wherein said toroidal type continuously variable transmission is a single cavity transmission.

11. A continuously variable transmission apparatus according to claim 10, further comprising a portion to be driven connected to said output shaft, including a wheel-driving axle disposed on an opposite side of said plane from said central shaft of said planetary gear mechanism.

12. A continuously variable transmission apparatus according to claim 2, further comprising a portion to be driven connected to said output shaft, including a wheel-driving axle disposed on an opposite side of said plane from said central shaft of said planetary gear mechanism.

13. A continuously variable transmission apparatus including an input shaft, an output shaft, a toroidal type continuously variable transmission of a single cavity type in which an angle of inclination of a power roller sandwiched between an input disc and an output disc is changed to thereby change a transmission gear ratio between said input disc and said output disc, a planetary gear mechanism, a pair of power transmitting mechanisms arranged for connecting said toroidal type continuously variable transmission and said planetary gear mechanism together, and a changeover system operative to change a transmission state between said input shaft and said output shaft among a high-speed running mode, a low-speed running mode and a receding mode, wherein in the low-speed running mode, all motive power between said input shaft and said output shaft is transmitted through said toroidal type continuously variable transmission, and in the high-speed running mode, the motive power is transmitted by said planetary gear mechanism and some of the motive power is circulated to said toroidal type continuously variable transmission through said planetary gear mechanism, characterized in that the input disc and output disc of said toroidal type continuously variable transmission are disposed coaxially with a driving shaft and the input shaft, and said pair of power transmitting mechanisms are both disposed on said input shaft between said output disc and said driving shaft, a first of said pair of power transmitting mechanisms being disposed on said input shaft on one side of a roller bearing supporting said output disc on said input shaft, and a second of said pair of power transmitting mechanisms being disposed on the opposite side of said roller bearing from the first of said pair of power transmitting mechanisms.

14. A continuously variable transmission apparatus including an input shaft rotatively driven by a driving shaft, an output shaft which takes out motive power based on the rotation of said input shaft, a single cavity toroidal type continuously variable transmission, a planetary gear mechanism, said toroidal type continuously variable transmission being adapted to change an angle of inclination of a power roller sandwiched between an input disc and an output disc disposed coaxially with each other to thereby change a transmission gear ratio between said input disc and said output disc, said planetary gear mechanism comprising a planetary gear provided between a sun gear for rotating said output shaft and a ring gear disposed around said sun gear, and rotatably supported on a carrier rotatably supported coaxially with said sun gear, said planetary gear being in meshing engagement with said sun gear and said ring gear, said carrier and said output disc being connected together so as to be capable of transmitting a rotational force by a first power transmitting mechanism provided on said input shaft between said output disc and said driving shaft, said input shaft and said ring gear being capable of being connected together so as to be capable of transmitting the rotational force by a second power transmitting mechanism provided on said input shaft between said output disc and said driving shaft, a first clutch operative to couple said second power transmitting mechanism and said ring gear, and a second clutch operative to couple two of the sun gear, the ring gear and the planetary gear of said planetary gear mechanism, and to prevent relative displacement of said three gears, the ratio $\beta/\alpha$ between a reduction ratio $\alpha$ of said first power transmitting mechanism and a reduction ratio $\beta$ of said second power transmitting mechanism being substantially equal to a reduction ratio $i_H$ of said toroidal type continuously variable transmission in a maximum acceleration setting thereof, wherein said first power transmitting mechanism is disposed on one side of a roller bearing supporting said output disc on said input shaft, and said second power transmitting mechanism is disposed on an opposite side of said roller bearing from said first power transmitting mechanism.

* * * * *